United States Patent
Aono et al.

(10) Patent No.: US 9,602,353 B2
(45) Date of Patent: Mar. 21, 2017

(54) COMMUNICATION MANAGEMENT SYSTEM, COMMUNICATION TERMINAL, COMMUNICATION SYSTEM, AND RECORDING MEDIUM STORING CONTROL PROGRAM

(71) Applicants: Yoshiko Aono, Kanagawa (JP); Taro Okuyama, Tokyo (JP)

(72) Inventors: Yoshiko Aono, Kanagawa (JP); Taro Okuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 427 days.

(21) Appl. No.: 14/315,633

(22) Filed: Jun. 26, 2014

(65) Prior Publication Data

US 2015/0006697 A1    Jan. 1, 2015

(30) Foreign Application Priority Data

Jun. 27, 2013  (JP) .................................. 2013-135233
Mar. 27, 2014  (JP) .................................. 2014-066035

(51) Int. Cl.
*G06F 15/16* (2006.01)
*H04L 12/24* (2006.01)
*H04L 29/08* (2006.01)

(52) U.S. Cl.
CPC .......... *H04L 41/0893* (2013.01); *H04L 67/30* (2013.01)

(58) Field of Classification Search
CPC ........................... H04L 41/0893; H04L 67/30
See application file for complete search history.

(56) References Cited

U.S. PATENT DOCUMENTS

| 8,117,073 | B1 | 2/2012 | Orttung et al. | |
| 8,145,276 | B2* | 3/2012 | Lee | H04M 1/72563 |
| | | | | 455/179.1 |
| 9,086,735 | B2* | 7/2015 | Wang | G06F 3/018 |
| 9,232,003 | B2* | 1/2016 | George | H04L 61/2564 |
| 9,363,228 | B2* | 6/2016 | Burns | H04L 29/1249 |
| 2009/0292785 | A1* | 11/2009 | Leedberg | G06Q 10/107 |
| | | | | 709/206 |
| 2010/0306250 | A1 | 12/2010 | Mizunashi | |
| 2012/0036583 | A1* | 2/2012 | Kichikawa | G06F 21/6218 |
| | | | | 726/27 |

(Continued)

FOREIGN PATENT DOCUMENTS

EP    2 416 550 A1    2/2012
JP    2002-041250    2/2002

(Continued)

OTHER PUBLICATIONS

Extended Search Report issued Dec. 5, 2014 in European Patent Application No. 14174424.3.

(Continued)

*Primary Examiner* — Moustafa M Meky
(74) *Attorney, Agent, or Firm* — Oblon, McClelland, Maier & Neustadt, L.L.P.

(57) ABSTRACT

A management system modifies a group of one or more member communication terminals indicated by first candidate information of a first communication terminal in response to information indicating to modify the first candidate information of the first communication terminal to generate second candidate information of a second communication terminal.

14 Claims, 26 Drawing Sheets

(56) References Cited

U.S. PATENT DOCUMENTS

| | | | |
|---|---|---|---|
| 2012/0072971 A1 | 3/2012 | Zhang et al. | |
| 2012/0120179 A1* | 5/2012 | Li | H04L 12/1818 348/14.02 |
| 2012/0131648 A1 | 5/2012 | Hayashida | |
| 2012/0179829 A1* | 7/2012 | George | H04L 61/2564 709/227 |
| 2012/0203916 A1* | 8/2012 | Burns | H04L 29/1249 709/227 |
| 2013/0007130 A1* | 1/2013 | Lu | H04L 67/24 709/204 |
| 2013/0031216 A1* | 1/2013 | Willis | H04L 67/02 709/219 |
| 2013/0179518 A1* | 7/2013 | Quan | H04L 67/2823 709/206 |
| 2013/0223292 A1 | 8/2013 | Okuyama et al. | |
| 2014/0044171 A1* | 2/2014 | Takehara | H04N 19/00696 375/240.14 |

FOREIGN PATENT DOCUMENTS

| | | |
|---|---|---|
| JP | 2007-081652 | 3/2007 |
| JP | 2010-282299 | 12/2010 |
| WO | WO 2012/074124 A1 | 6/2012 |

OTHER PUBLICATIONS

U.S. Appl. No. 14/315,908, filed Jun. 26, 2014.
U.S. Appl. No. 13/315,656, filed Jun. 26, 2014.

\* cited by examiner

FIG. 6

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 7

TERMINAL MANAGEMENT TABLE

| TERMINAL ID | NAME | OPERATION STATE | IP ADDRESS |
|---|---|---|---|
| 01aa | COMPANY X, BRANCH a, GROUP a | ON LINE | 1.2.1.3 |
| ... | ... | ... | ... |
| 01ba | COMPANY X, BRANCH b, GROUP a | ON LINE | 1.2.2.3 |
| ... | ... | ... | ... |
| 01db | COMPANY Y, BRANCH d, GROUP b | OFF LINE | 1.4.2.4 |

FIG. 8

CANDIDATE LIST MANAGEMENT TABLE

| REQUEST TERMINAL ID | COUNTERPART TERMINAL ID |
|---|---|
| 01aa | 01ab,01ac,···,01db |
| ... | ... |
| 01ac | 01aa,01ab |
| ... | ... |
| 01db | 01aa,··· |

FIG. 9A (A) GROUP DATA MANAGEMENT TABLE

| GROUP NAME | GROUP ID | MEMBER TERMINAL ID | OWNER TERMINAL ID | USER TERMINAL ID |
|---|---|---|---|---|
| PROJECT A | 0001 | 01aa, 01ab, 01ac, 01ca | 01aa | — |
| TEAM | 0002 | 01ac, 01ae | 01ac | 01ae |

FIG. 9B (B) GROUP DATA MANAGEMENT TABLE

| GROUP NAME | GROUP ID | MEMBER TERMINAL ID | OWNER TERMINAL ID | USER TERMINAL ID |
|---|---|---|---|---|
| PROJECT A | 0001 | 01aa, 01ab, 01ac, 01ca | 01aa | 01ac |
| TEAM | 0002 | 01ac, 01ae | 01ac | 01ae |

FIG. 9C (C) GROUP DATA MANAGEMENT TABLE

| GROUP NAME | GROUP ID | MEMBER TERMINAL ID | OWNER TERMINAL ID | USER TERMINAL ID |
|---|---|---|---|---|
| PROJECT A | 0001 | 01aa, 01ab, 01ac, 01ca | 01aa | — |
| PROJECT A (COMPANY X) | 0003 | 01aa, 01ab, 01ac | 01ac | — |
| TEAM | 0002 | 01ac, 01ae | 01ac | 01ae |

SHARE REQUEST MANAGEMENT TABLE

| SHARE REQUEST SENDER TERMINAL ID | SHARE REQUEST DESTINATION TERMINAL ID | GROUP ID | RULE |
|---|---|---|---|
| 01aa | 01ab | 0001 | B |
| 01aa | 01ac | 0001 | B |
| 01aa | 01ba | 0001 | B |

FIG. 14

| GROUP NAME | |
|---|---|
| PROJECT A | SHARE REQUEST |
| ... | ... |

FIG. 15

| ☐ | 01ab | COMPANY X, BRANCH a, GROUP b |
|---|---|---|
| ☑ | 01ac | COMPANY X, BRANCH a, GROUP c |
| ... | ... | ... |
| ☐ | 01db | COMPANY Y, BRANCH d, GROUP b |

| ○ | A | UNREGISTERED MEMBER NOT DISCLOSED |
| ⦿ | B | ADD UNREGISTERED MEMBER WITH APPROVAL REQUEST |
| ○ | C | ADD UNREGISTERED MEMBER WITHOUT APPROVAL REQUEST |

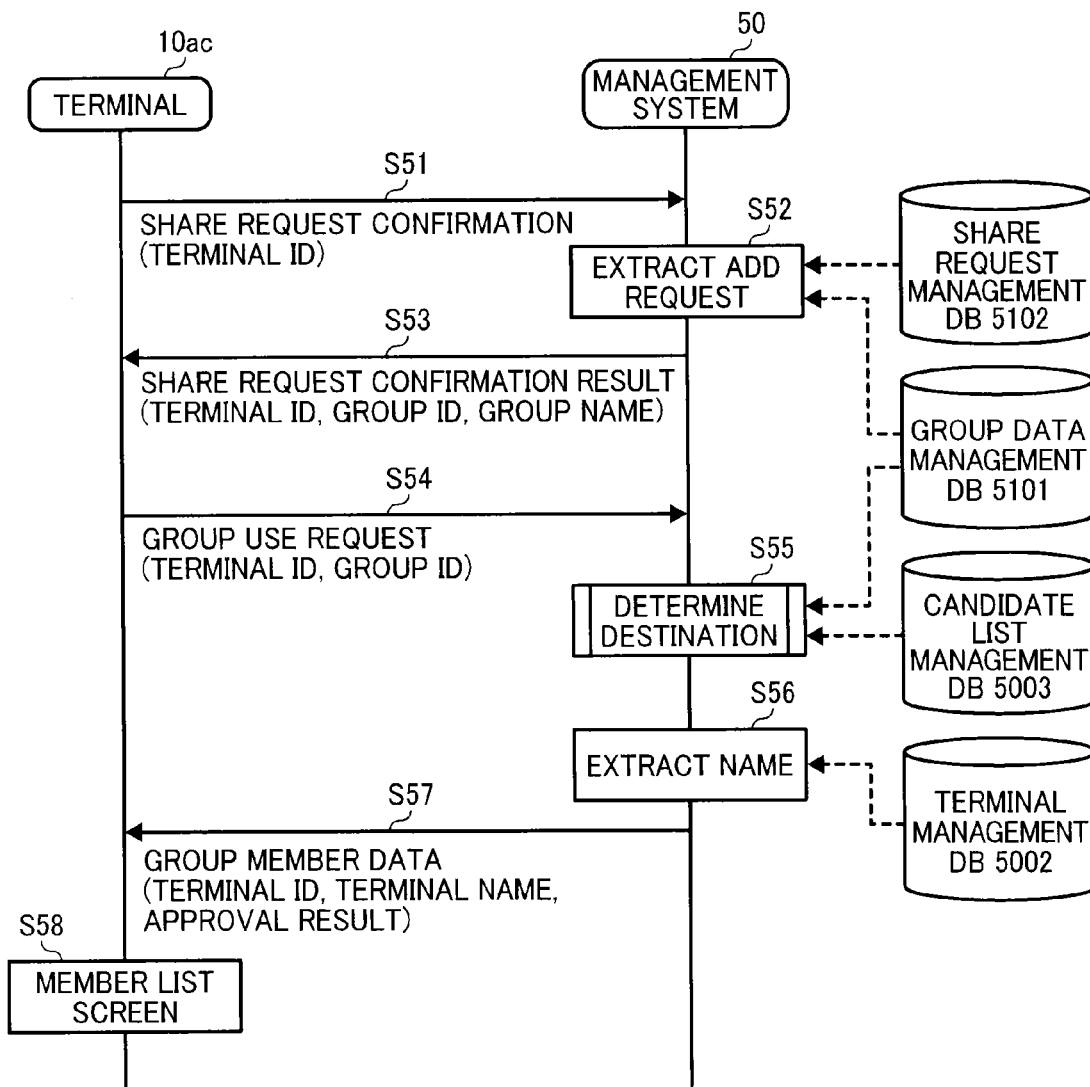

FIG. 21

| REQUEST TERMINAL | NAME | APPROVAL STATUS |
|---|---|---|
| 01aa | COMPANY X, HEAD OFFICE a, GROUP a | APPROVED |
| 01ab | COMPANY X, BRANCH a, GROUP b | APPROVED |

FIG. 22

| REQUEST TERMINAL | NAME | APPROVAL STATUS |
|---|---|---|
| 01aa | COMPANY X, HEAD OFFICE a, GROUP a | APPROVED |
| 01ab | COMPANY X, BRANCH a, GROUP b | APPROVED |
| 01ca | COMPANY Y, HEAD OFFICE c, GROUP a | [APPROVAL REQUEST] |

FIG. 23

| REQUEST TERMINAL | NAME | APPROVAL STATUS |
|---|---|---|
| 01aa | COMPANY X, HEAD OFFICE a, GROUP a | APPROVED |
| 01ab | COMPANY X, BRANCH a, GROUP b | APPROVED |
| 01ca | COMPANY Y, HEAD OFFICE c, GROUP a | NOT NEEDED |

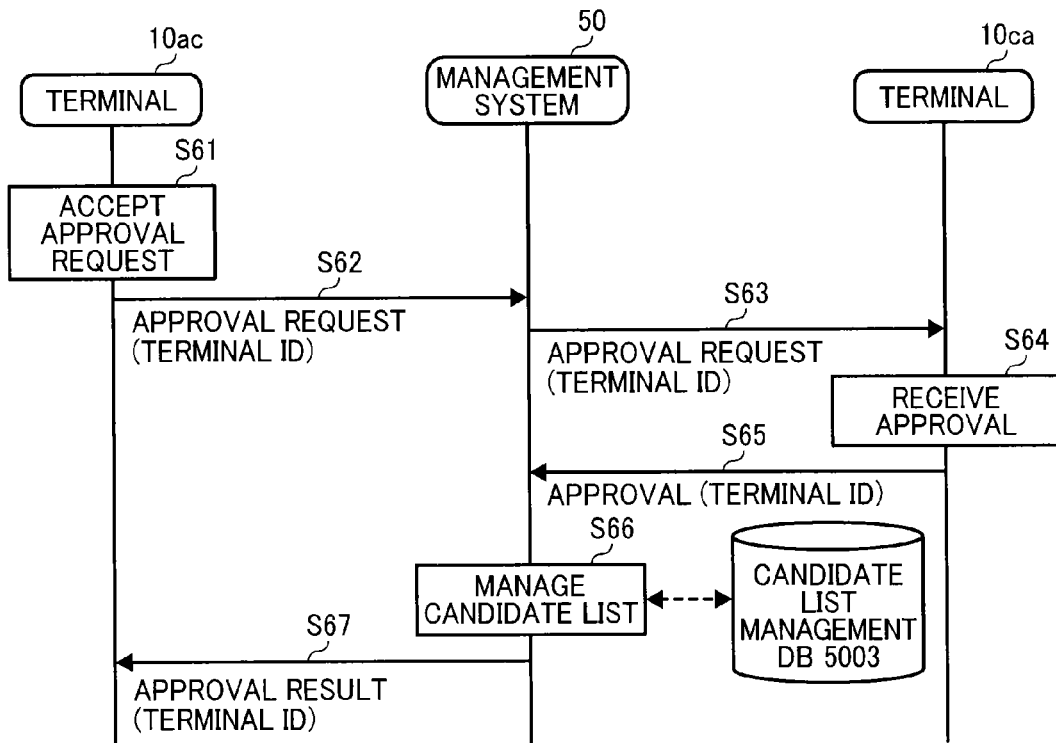
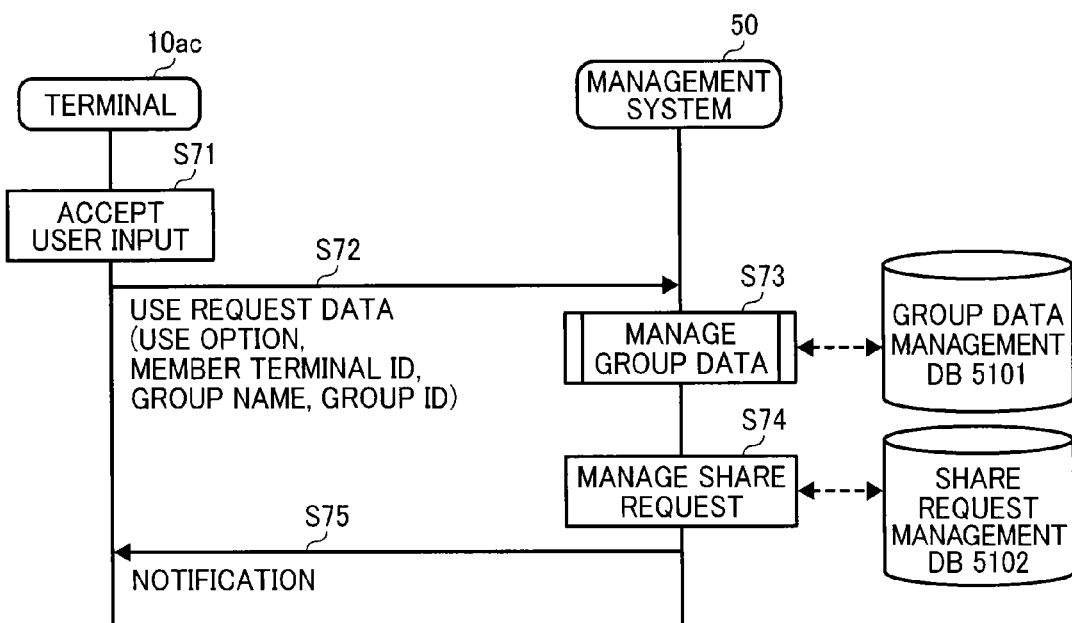

FIG. 26

| ORIGINAL | COPY |
|---|---|

GROUP NAME: PROJECT A

| COUNTERPART TERMINAL ID | NAME |
|---|---|
| 01aa | COMPANY X, HEAD OFFICE a, GROUP a |
| 01ab | COMPANY X, BRANCH a, GROUP b |
| 01ca | COMPANY Y, HEAD OFFICE c, GROUP a |

[ SAVE ]  [ CANCEL ]

FIG. 27

| ORIGINAL | COPY |
|---|---|

GROUP NAME [ PROJECT A ]

| COUNTERPART TERMINAL ID | NAME | EDIT |
|---|---|---|
| 01aa | COMPANY X, HEAD OFFICE a, GROUP a | [ DELETE ] |
| 01ab | COMPANY X, BRANCH a, GROUP b | [ DELETE ] |
| 01ca | COMPANY Y, HEAD OFFICE c, GROUP a | [ DELETE ] |

[ SAVE ]  [ CANCEL ]

COMMUNICATION MANAGEMENT SYSTEM, COMMUNICATION TERMINAL, COMMUNICATION SYSTEM, AND RECORDING MEDIUM STORING CONTROL PROGRAM

CROSS-REFERENCE TO RELATED APPLICATIONS

This patent application is based on and claims priority pursuant to 35 U.S.C. §119(a) to Japanese Patent Application Nos. 2013-135233, filed on Jun. 27, 2013, and 2014-066035, filed on Mar. 27, 2014, in the Japan Patent Office, the entire disclosure of which is hereby incorporated by reference herein.

BACKGROUND

Technical Field

The present invention generally relates to managing candidate information indicating one or more candidate counterpart terminals for a communication terminal.

Description of the Related Art

With the need for reducing costs or times associated with business trips, more companies are moving towards communication systems to have communication among remotely located offices via a communication network such as the Internet or a leased line. To facilitate the process of selecting one or more counterpart communication terminals to start communication with, the user at a request communication terminal may previously generate a list of one or more candidates of counterpart communication terminals. Before starting communication, the user at the request communication terminal may easily select one or more counterpart communication terminals, from the list of candidate counterpart communication terminals being displayed.

SUMMARY

A management system modifies a group of one or more member communication terminals indicated by first candidate information of a first communication terminal in response to information indicating to modify the first candidate information of the first communication terminal to generate second candidate information of a second communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is an example data structure of an authentication management table, managed by the management system of FIG. 5;

FIG. 7 is an example data structure of a terminal management table, managed by the management system of FIG. 5;

FIG. 8 is an example data structure of a candidate list management table, managed by the management system of FIG. 5;

FIGS. 9A to 9C are example data structures of a group data management table, managed by the management system of FIG. 5;

FIG. 14 is an illustration of an example group name display screen;

FIG. 15 is an illustration of a share request destination selection screen;

FIG. 18 is a data sequence diagram illustrating operation of adding one or more member terminals in the group member list as a candidate counterpart terminal for the share request destination terminal, according to an example embodiment of the present invention;

FIG. 19 is an illustration of an example share request confirmation screen;

FIG. 21 is an illustration of an example member list screen;

FIG. 22 is an illustration of an example member list screen;

FIG. 23 is an illustration of an example member list screen;

FIG. 24 is a data sequence diagram illustrating operation of processing an approval request to obtain approval to add an unregistered member terminal as a candidate counterpart terminal, performed by the communication system of FIG. 1, according to an example embodiment of the present invention;

FIG. 25 is a data sequence diagram illustrating operation of managing group information, performed by communication system of FIG. 1, according to an example embodiment of the present invention;

FIG. 26 is an example use request screen, which may be selected when the original group information is to be used;

FIG. 27 is an example use request screen, which may be selected when the group information is to be used after modification;

Figure 1:
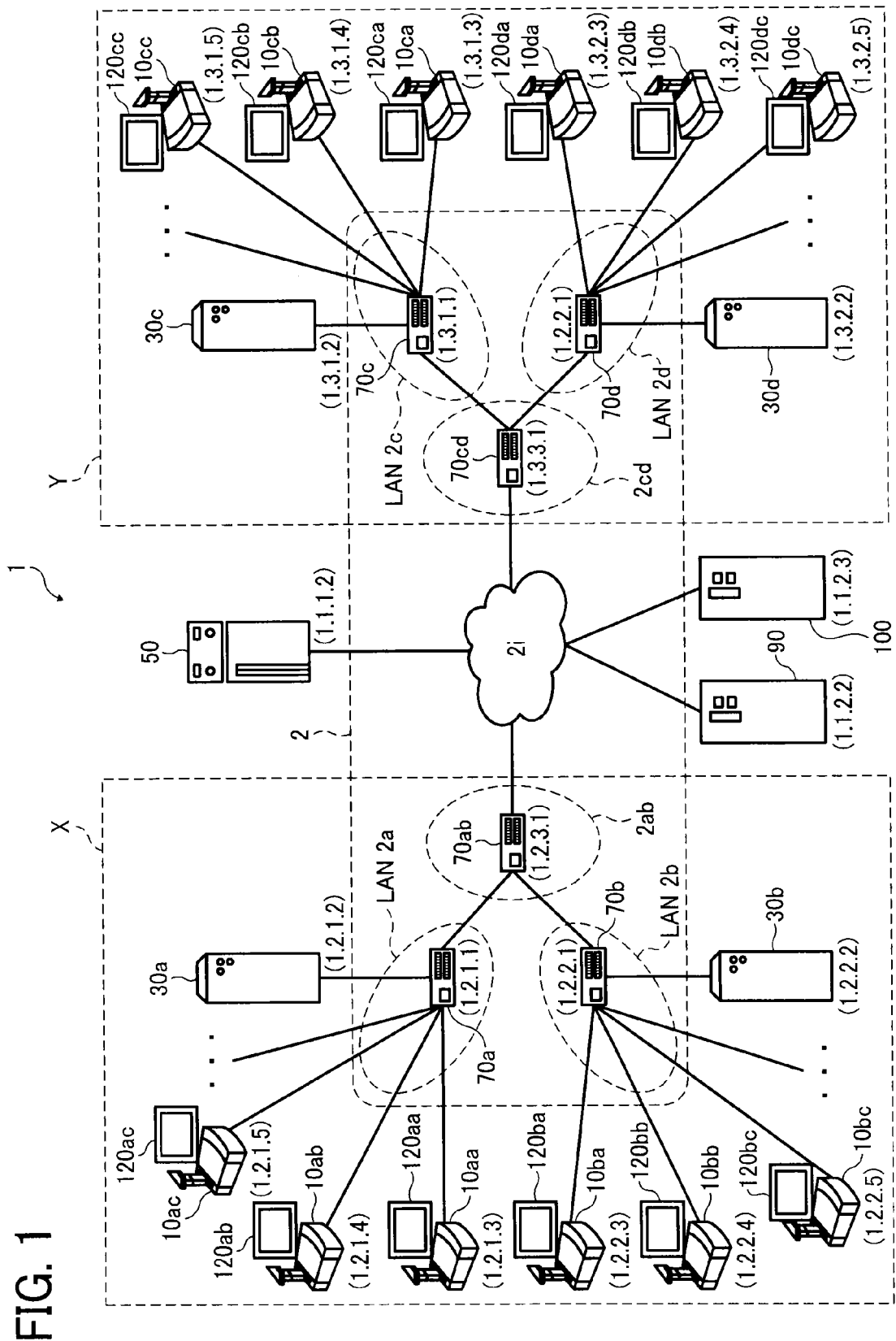
FIG. 1 is a schematic diagram illustrating a configuration of a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to FIGS. 1 to 30, a communication system 1 is explained according to an example embodiment of the present invention. FIG. 1 illustrates a configuration of the communication system 1.

In the following examples, it is assumed that the communication system 1 of FIG. 1 is implemented as a communication system, which allows transmission of data or any information that reflects the feelings of a user, between or among a plurality of communication terminals 10 via a communication management system 50. Examples of the communication system include, but not limited to, a video communication system such as a videoconference system or a teleconference system.

In particular, in the following examples, it is assumed that the communication system 1 of FIG. 1 is implemented as the videoconference system, which is one example structure of the communication system. Based on this assumption, the communication management system 50 is implemented as the videoconference communication management system, which is one example structure of the communication management system. Further, the communication terminal 10 is implemented as the videoconference communication terminal, which is one example structure of the communication terminal. However, the use of communication system 1 is not limited to the following examples such that the communication system 1 may be implemented as any desired system other than the communication system described below.

The communication system 1 of FIG. 1 includes a plurality of communication terminals 10aa, 10ab, 10ac, 10ba, 10bb, 10bc, 10ca, 10cb, 10cc, 10da, 10db, and 10dc, a plurality of displays 120aa, 120ab, 120ac, 120ba, 120bb, 120*bc*, 120*ca*, 120*cb*, 120*cc*, 120*da*, 120*db*, and 120*dc*, a plurality of relay devices 30*a*, 30*b*, 30*c*, and 30*d*, the communication management system 50, a program providing system 90, and a maintenance system 100.

The communication terminal 10 transmits or receives contents data, such as image data and/or sound data, to or from another communication terminal 10.

For the descriptive purposes, in this example, any number of the plurality of communication terminals 10*aa* to 10*dc* may be collectively or each referred to as the terminal 10. Any number of the plurality of displays 120*aa* to 120*dc* may be collectively or each referred to as the display 120. Any one of the plurality of relay devices 30*a*, 30*b*, 30*c*, and 30*d* may be collectively or each referred to as the relay device 30. The communication management system 50 may be referred to as the "management system" 50.

The relay device 30 relays contents data, such as image data and/or sound data, between or among the plurality of terminals 10. The management system 50, which may be implemented by one or more computers to cooperatively function as a computer system, centrally manages various information such as login information of the terminal 10, the communication state of the terminal 10, candidate list information, and the communication state of the relay device 30.

The communication system 1 further includes a plurality of routers 70*a*, 70*b*, 70*c*, 70*d*, 70*ab*, and 70*cd*, which may be collectively or each referred to as the router 70. The router 70 selects a route that is most suitable for transmitting contents data such as image data and sound data. In this example, a moving image, a still image, or both of the still image and the moving image, may be transmitted as the image data.

The program providing system 90 includes a hard disk device (HD) 204 (FIG. 4), which stores a terminal control program that causes the terminal 10 to perform various functions or operations. For example, the program providing system 90 sends the terminal control program to the terminal 10 through the Internet 2*i* to cause the terminal 10 to install the terminal control program. Further, the HD 204 of the program providing system 90 may store a relay control program that causes the relay device 30 to perform various functions or operations. For example, the program providing system 90 sends the relay control program to the relay device 30 through the Internet 2*i* to cause the relay device 30 to install the relay control program. Further, the HD 204 of the program providing system 90 may store a communication management program that causes the management system 50 to perform various functions or operations. For example, the program providing system 90 sends the communication management program to the management system 50 to cause the management system 50 to install the communication management program.

The maintenance system 100 is a computer system, which may be implemented by one or more computers, to maintain, manage, fix, or upgrade at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communications network 2. The maintenance system 100 may manage maintenance of at least one of the terminal 10, relay device 30, management system 50, and program providing system 90 without using the communications network 2. For example, a machine type number, a manufacturing number, customer information, maintenance and repair information, and failure log information may be maintained at the maintenance system 100 without using the communications network 2.

Still referring to FIG. 1, the terminals 10*aa*, 10*ab*, and 10*ac*, the relay device 30*a*, and the router 70*a* are connected to a local area network (LAN) 2*a*. The terminals 10*ba*, 10*bb*, and 10*bc*, the relay device 30*b*, and the router 70*b* are connected to a LAN 2*b*. The LAN 2*a* and the LAN 2*b* are connected to a leased line 2*ab* in which the router 70*ab* is provided. It is assumed that the LAN 2*a*, LAN 2*b*, and the leased line 2*ab*, are within a private network X. For example, assuming that the private network X is managed by Company X, the LAN 2*a* corresponds to a network managed by a branch office "a", and the LAN 2*b* corresponds to a network managed by a branch office "b".

The terminals 10*ca*, 10*cb*, and 10*cc*, the relay device 30*c*, and the router 70*c* are connected to a LAN 2*c*. The terminals 10*da*, 10*db*, and 10*dc*, the relay device 30*d*, and the router 70*d* are connected to a LAN 2*d*. The LAN 2*c* and the LAN 2*d* are connected to a leased line 2*cd* in which the router 70*cd* is provided. It is assumed that the LAN 2*c*, LAN2*d*, and leased line 2*cd*, are within a private network Y other than the private network X. For example, assuming that the private network Y is managed by Company Y, the LAN 2*c* corresponds to a network managed by a branch office "c", and the LAN 2*d* corresponds to a network managed by a branch office "d". The network X and the network Y are connected through the Internet 2*i*, via the routers 70*ab* and 70*cd*.

The management system 50 and the program providing system 90 are connected through the Internet 2*i* to the terminal 10 and the relay device 30. The management system 50 is made communicable with the terminal 10 and the relay device 30 through the communications network 2. Any one of the management system 50 and the program providing system 90 may be located at any network location within or outside any one of the network X and the network Y.

In this example, the communications network 2 includes the LAN 2*a*, LAN 2*b*, leased line 2*ab*, Internet 2*i*, leased line 2*cd*, LAN 2*c*, and LAN 2*d*. Any one or any portion of these lines or any other lines that may be included in the communications network 2 may be implemented as wired network or wireless network such as Wireless Fidelity (WiFi) network or Bluetooth network.

As illustrated in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10*aa* is "1.2.1.3". For simplicity, it is assumed that the IP address is expressed in IPv4. Alternatively, the IP address may be expressed in IPv6.

Further, in this example, the terminal 10 may be communicated in various ways, other than the example case in which the terminals 10 at different companies or different branch offices communicate with one another. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Communication System>

Figure 2:
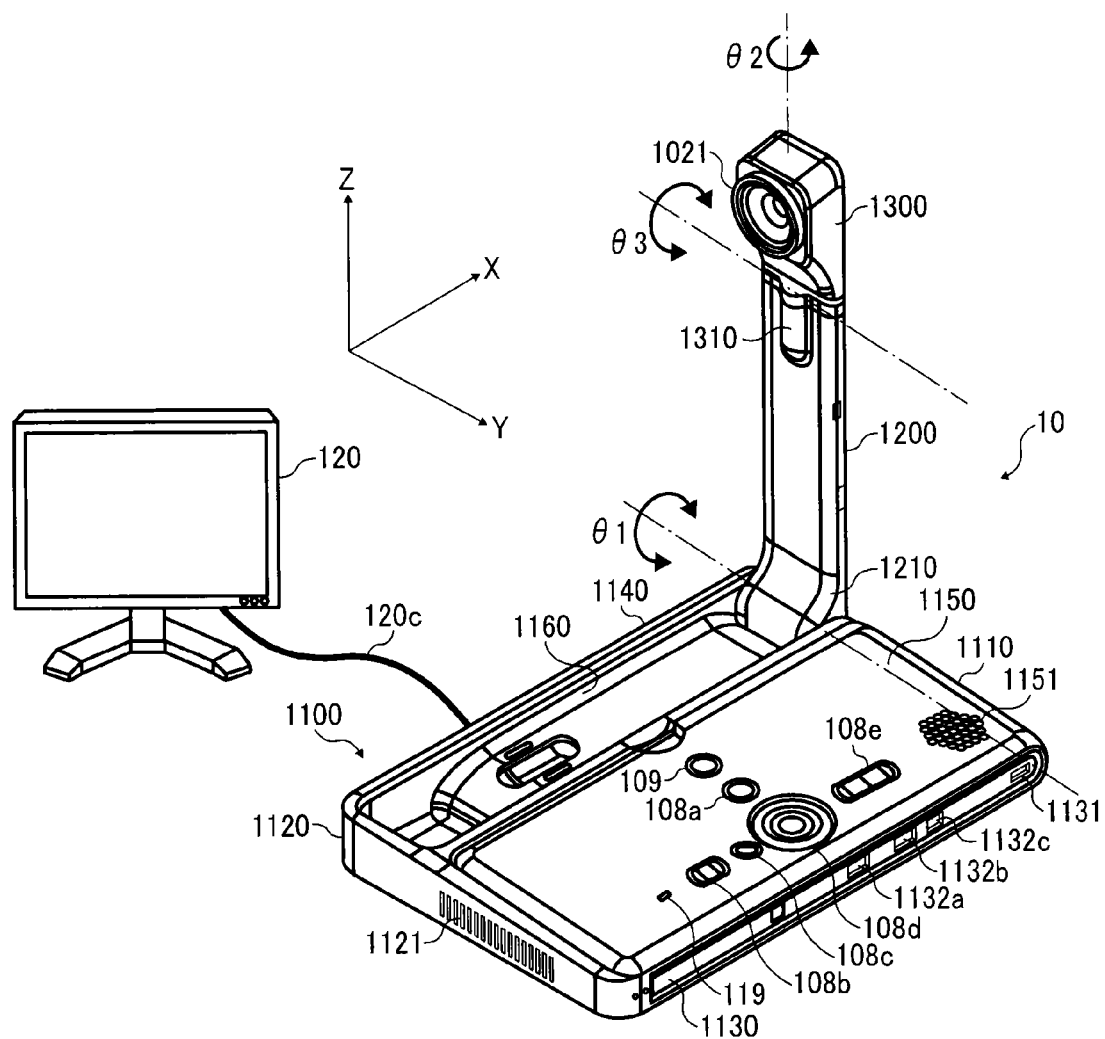
FIG. 2 is a perspective view illustrating the outer appearance of a communication terminal of the communication system of FIG. 1.

FIG. 2 is a perspective view illustrating the outer appearance of the communication terminal 10 of the communication system 1 of FIG. 1. In FIG. 2, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction. As illustrated in FIG. 2, the terminal 10 includes a body 1100, an arm 1200, and a camera housing 1300. The body 1100 includes a front side wall 1110 having a plurality of air intake holes that are formed over the nearly entire surface of the intake surface of the front side wall 1110. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 3) of the terminal 10 is able to catch sounds such as human voice or any sound including noise.

Figure 3:
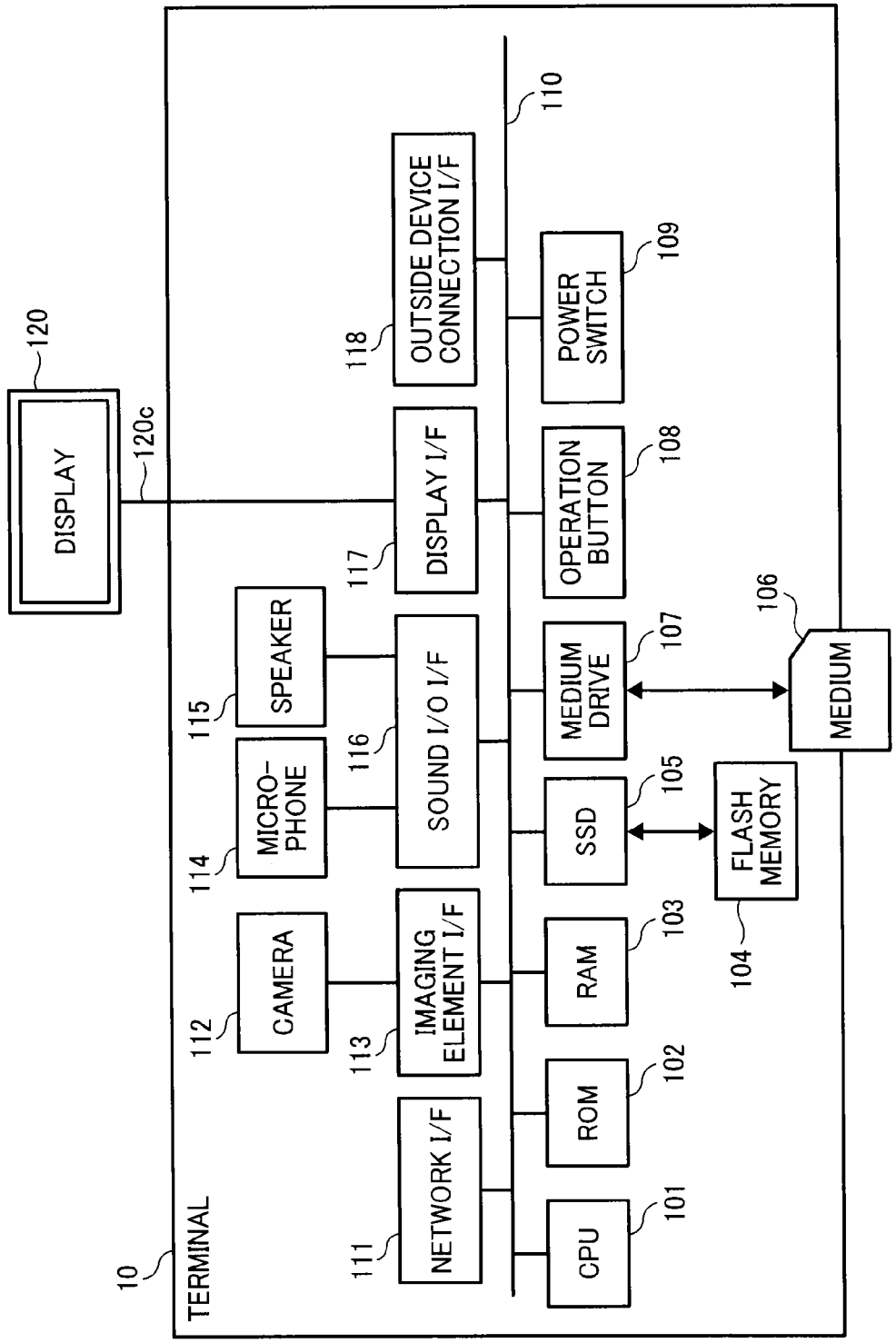
FIG. 3 is a schematic block diagram illustrating a hardware structure of the communication terminal of FIG. 2.

The body 1100 has an operation panel 1150, which is provided at a front surface toward the right side wall 1130. The operation panel 1150 includes a plurality of operation keys 108a to 108e ("the operation key 108"), a power switch 109, an alarm lamp 119, and a plurality of sound output holes 1151. Through the sound output holes 1151, a speaker 115 (FIG. 3) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 3). The body 1100 further includes a left side wall 1140, which is provided with a connection port to connect the external display 120 to the display I/F 117 through a cable 120c.

The arm 1200 is attached to the body 1100 via a torque hinge 1210. With the torque hinge 1210, the arm 1200 can be rotated in directions of up and down with respect to the body, while making a tilt angle θ1 of up to 135 degrees. FIG. 2 illustrates the case where the tilt angle θ1 is 90 degrees.

The camera housing 1300 incorporates therein the camera 112 (FIG. 3) that takes an image of an object. The object may be a part of a user, document, or a room where the terminal 10 is located. The camera housing 1300 is provided with a torque hinge 1310. The camera housing 1300 is attached to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

In alternative to the outer appearance of FIG. 2, the communication terminal 10 may be implemented to have any other outer appearance. For example, the communication terminal 10 may look like the general-purpose PC, smart phone, or tablet. Further, the camera or the microphone does not have to be incorporated into the terminal 10, such that the camera or the microphone that is independent of the terminal 10 may be connected to the terminal 10.

The relay device 30, the management system 50, the program providing system 90, and the maintenance system 100 are each implemented by any desired number of general-purpose computers such as a personal computer or a server computer. For simplicity, explanation of the outer appearance of the computer is omitted.

FIG. 3 is a schematic block diagram illustrating a hardware structure of the communication terminal 10. As illustrated in FIG. 3, the terminal 10 includes a central processing unit (CPU) 101, a read only memory (ROM) 102, a random access memory (RAM) 103, a flash memory 104, a solid state drive (SSD) 105, a medium drive 107, the operation key 108, the power switch 109, a network interface (I/F) 111, the camera 112, an imaging element interface (I/F) 113, the microphone 114, the speaker 115, a sound input/output interface (I/O I/F) 116, the display interface (I/F) 117, and the outside device connection interface (I/F) 118, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area for the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device.

The display 120 may be implemented by a liquid crystal display (LCD) or an organic light emitting display, which displays various data such as an image of an object or an operation icon. As illustrated in FIGS. 2 and 3, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 2). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 4:
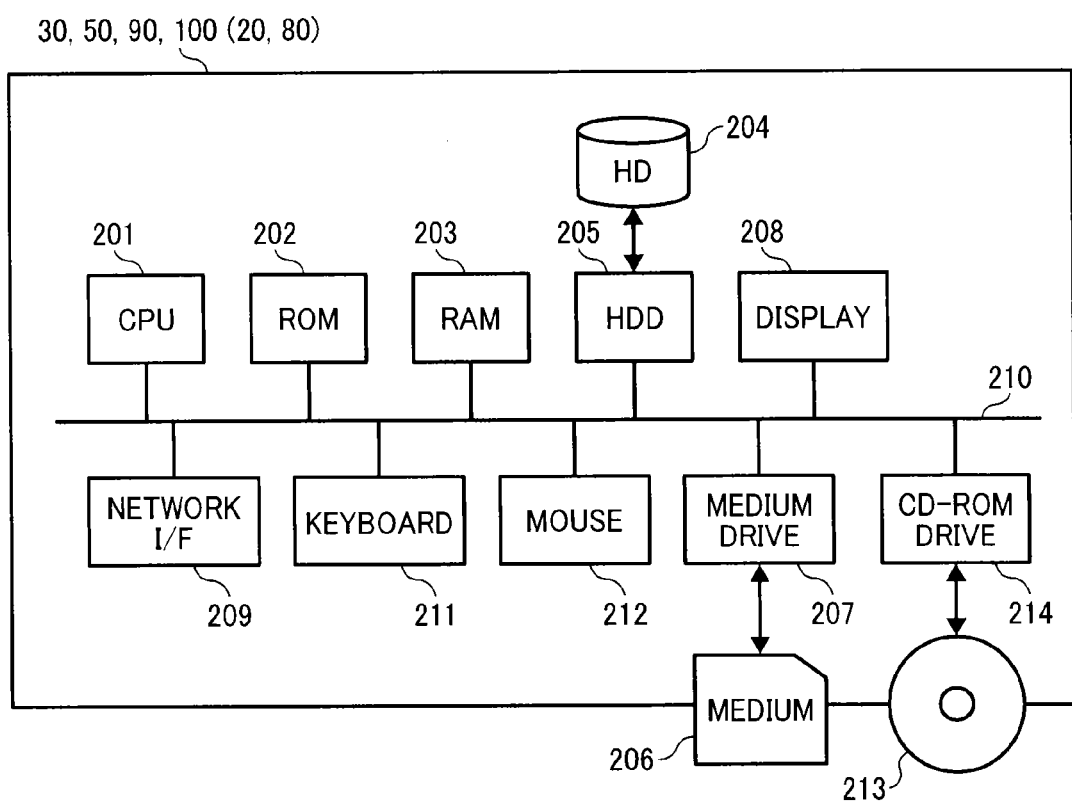
FIG. 4 is a schematic block diagram illustrating a hardware structure of any one of a management system, relay device, program providing system, and maintenance system, according to an example embodiment of the present invention.

FIG. 4 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area for the CPU 201. The HD 204 stores therein various data such as the communication management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay device 30 is substantially similar in hardware structure to the management system 50 of FIG. 4, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 4, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 4, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Communication System>

Figure 5:
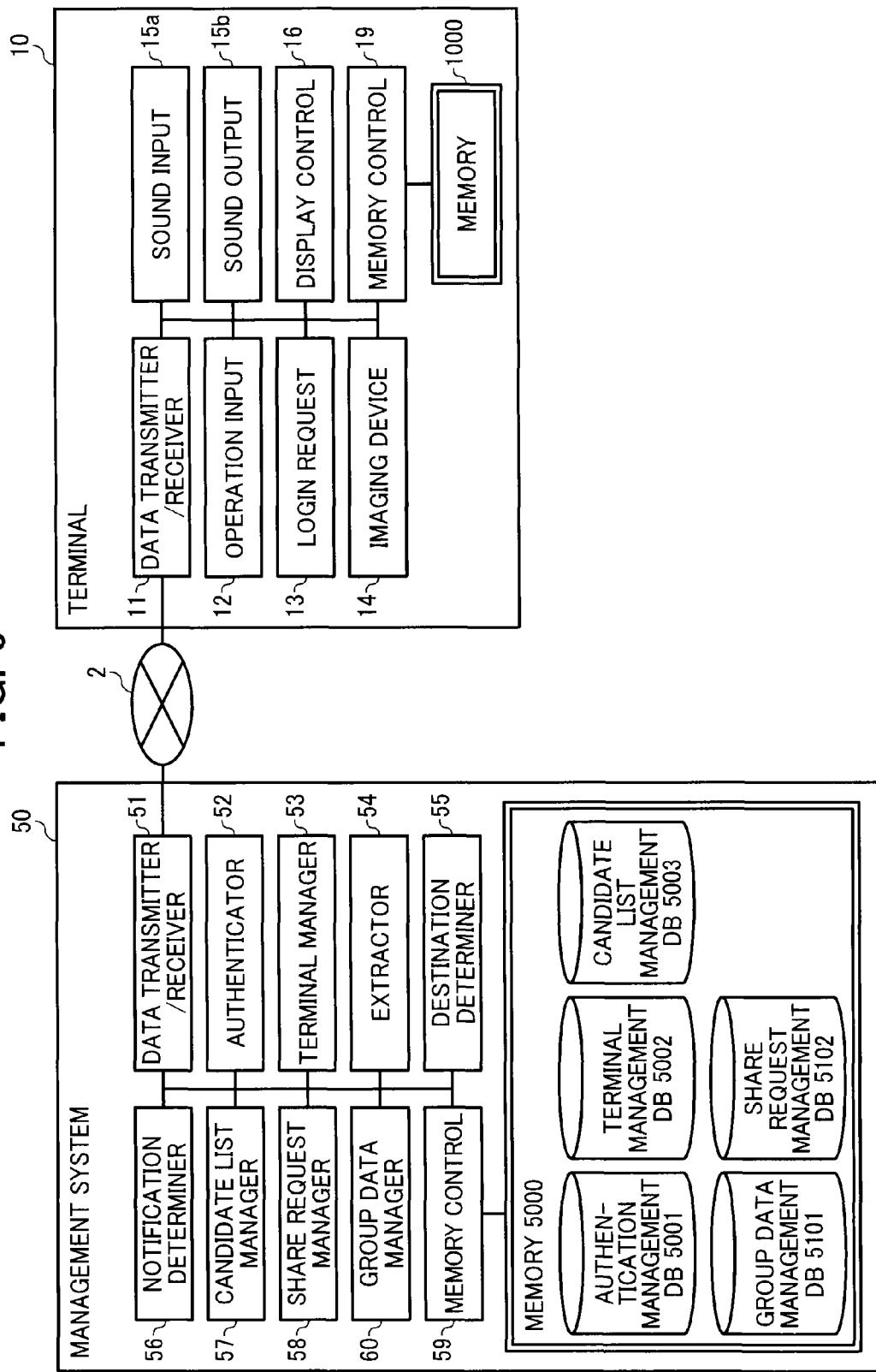
FIG. 5 is a schematic block diagram illustrating a functional structure of the communication terminal and the management system of the communication system of FIG. 1.

Next, a functional structure of the communication system 1 of FIG. 1 is explained according to an example embodiment of the present invention. FIG. 5 is a schematic block diagram illustrating a functional structure of the communication system 1. As illustrated in FIG. 5, the terminal 10 and the management system 50 exchange data with one another through the communications network 2. In FIG. 5, the relay device 30, the program providing system 90 and the maintenance system 100 of FIG. 1 are omitted.

<Functional Structure of Terminal>

The communication terminal 10 includes a data transmitter/receiver 11, an operation input 12, a login request 13, an imaging device 14, a sound input 15a, a sound output 15b, a display control 16, and a memory control 19.

In this example, the operations or functions that are performed by the terminal 10, which include the operations or functions performed by the functional elements shown in FIG. 5, are performed in cooperation with one or more hardware devices of the terminal 10 that are shown in FIG. 3. More specifically, these elements shown in FIG. 5 correspond to a plurality of functions or functional modules, which are executed according to an instruction of the CPU 101 (FIG. 3) that is generated according to the program being loaded from the flash memory 104 onto the RAM 103. The terminal 10 further includes a memory 1000, which may be implemented by the RAM 103 or the flash memory 104 of FIG. 3.

The data transmitter/receiver 11 of the terminal 10, which may be implemented by the network I/F 111 (FIG. 3) under control of the CPU 101, transmits or receives various data or information to or from another terminal, device, or system, through the communications network 2. In this example, the data transmitter/receiver 11 starts receiving the operation state information that indicates the operation state of each candidate counterpart terminal 10 from the management system 50, before starting communication with any counterpart terminal 10. The operation state of the candidate counterpart terminal 10 indicates whether the candidate counterpart terminal 10 is online or offline. When the terminal 10 is online, the operation state of the candidate counterpart terminal 10 further indicates whether the candidate counterpart terminal 10 is available for communication ("communication OK"), the candidate counterpart terminal 10 is having communication with the other terminal ("communicating"), or the candidate counterpart terminal 10 is not available as the user leaves the seat. The operation state of the candidate counterpart terminal 10 may further indicate whether the candidate counterpart terminal 10 is online but in trouble or error ("online, communicating, trouble"), the candidate counterpart terminal 10 is online but not capable of outputting image data such that only sound data is output, or the candidate counterpart terminal 10 is online but in mute state ("online, mute") such that sound data is not output. For example, when the cable 120c is disconnected from the terminal 10, the operation state of the candidate counterpart terminal 10 is assumed to be in the trouble state. For the descriptive purposes, in the following examples, it is assumed that the operation state information indicates whether the candidate counterpart terminal 10 is online or offline, and if online, whether the candidate terminal 10 is available for communication.

The operation input 12 receives a user instruction input by the user through the operation key 108 or the power switch 109 (FIG. 3), under control of the instructions received from the CPU 101.

The operations or functions of the login request 13 are performed according to an instruction received from the CPU 101 (FIG. 3). When the power of the terminal 10 is turned on, the login request 13 automatically causes the data transmitter/receiver 11 to send login request information that requests the login process, and a current IP address of the terminal 10, to the management system 50 through the communications network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging device 14 of the terminal 10 are performed by the camera 112 and the imaging element I/F 113 according to an instruction received from the CPU 101 (FIG. 3). The imaging device 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 of FIG. 5 are performed by the display I/F 117 according to an instruction received from the CPU 101 (FIG. 3). The display control 16 controls transmit of image data to the display 120.

The memory control 19 is implemented by the SSD 105 of FIG. 3 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 115.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Management System>

The management system 50 includes a data transmitter/receiver 51, an authenticator 52, a terminal manager 53, an extractor 54, a destination determiner 55, a notification determiner 56, a candidate list manager 57, a share request manager 58, a group data manager 60, and a memory control 59. These units shown in FIG. 5 correspond to a plurality of functions or functional modules, which are executed according to an instruction of the CPU 201 (FIG. 4) that is generated according to the communication management program being loaded from the HD 204 onto the RAM 203. The management system 50 further includes a memory 5000, which may be implemented by the HD 204 (FIG. 4). The memory 500 stores various data or information.

(Authentication Management Table)

The memory 5000 includes an authentication management database (DB) 5001, which stores therein an authentication management table of FIG. 6. The authentication management table of FIG. 6 stores, for each one of the terminals 10 that are managed by the management system 50, the terminal ID and the password in association with each other. For example, referring to FIG. 6, the terminal 10aa has the terminal ID "01aa" and the password "aaaa".

(Terminal Management Table)

The memory 5000 further includes a terminal management DB 5002, which stores therein a terminal management table of FIG. 7. The terminal management table of FIG. 7 stores, for each one of the terminal IDs assigned to the terminals 10, the terminal name of the terminal 10, the operation state of the terminal 10, and the IP address of the terminal 10, in association with one another. For example, for the terminal 10aa having the terminal ID "01aa", the terminal management table of FIG. 7 indicates that the terminal name is "Company X, Branch a, Group a", the operation state is online ("ONLINE"), and the IP address of the terminal 10aa is "1.2.1.3".

(Candidate List Management Table)

The memory 5000 further includes a candidate list management DB 5003, which stores therein a candidate list management table of FIG. 8. The candidate list management table of FIG. 8 stores, for each one of a plurality of request terminals 10 capable of requesting for videoconference communication, the terminal ID of the request terminal 10, and one or more terminal IDs that are respectively assigned to candidate counterpart terminals 10 that are previously registered for the request terminal 10. In this example, for the request terminal 10, one or more terminals 10 of the communication system 1 of FIG. 1 are previously registered as the candidate counterpart terminal 10. For example, the candidate list management table of FIG. 8 indicates that the request terminal 10aa having the terminal ID "01aa" can request for videoconference with respect to the terminal 10ab having the terminal ID "01ab", the terminal 10ac having the terminal ID "01ac", and the terminal 10db having the terminal ID "01db", etc. The management system 50 manages the candidate list management table of FIG. 8, for example, according to a user instruction received from any one of the terminals 10. For example, in response to a user instruction received from the terminal 10aa, the management system 50 may add or delete the contents of the candidate list management table of FIG. 8.

(Group Data Management Table)

The memory 5000 further includes a group data management DB 5101, which stores therein a group data management table of any one of FIGS. 9A to 9C (collectively referred to as FIG. 9). The group data management table of FIG. 9 stores, for each group, a group name, a group ID, a member terminal ID, an owner terminal ID, and a user terminal ID, in association with one another. The group ID is any identification information that identifies a specific group. The member terminal ID is a terminal ID that identifies each one of the terminals 10 ("member terminal") belonging to the specific group. In this example, assuming that the user at the terminal 10aa creates a specific group, each one of the member terminals belonging to the specific group is registered as a candidate counterpart terminal for the terminal 10aa that is the request terminal 10aa. The owner terminal ID is a terminal ID that identifies the terminal 10 of an owner user who owns a group member list for the specific group. More specifically, the owner user is capable of requesting addition or deletion of a member terminal to or from the specific group, or capable of requesting to share a group member list with another terminal 10. The user terminal ID is a terminal ID that identifies the terminal 10, other than the owner terminal of the group member list, which is capable of using the group member list. For example, the user terminal may be the terminal of the user who is requested by the owner user to share the group member list.

As described below, in this example, it is assumed that the memory 5000 stores the group data management table of FIG. 9A.

Referring to FIG. 9A, the group data management table stores various information ("group information") regarding a specific group with the group ID "0002". The group name of the group having the group ID "0002" is "TEAM". The member terminals of the group "TEAM" includes the terminal 10ac having the terminal ID "01ac" and the terminal 10ae having the terminal ID "01ae". The owner terminal of the group "TEAM" is the terminal 10ac having the terminal ID "01ac". The user terminal of the group "TEAM" is the terminal 10ae having the terminal ID "01ae". The group information such as the group member list for the group "TEAM" can be used by the owner terminal 10ac and the user terminal 10ae.

(Share Request Management Table)

Figures 10, 11:
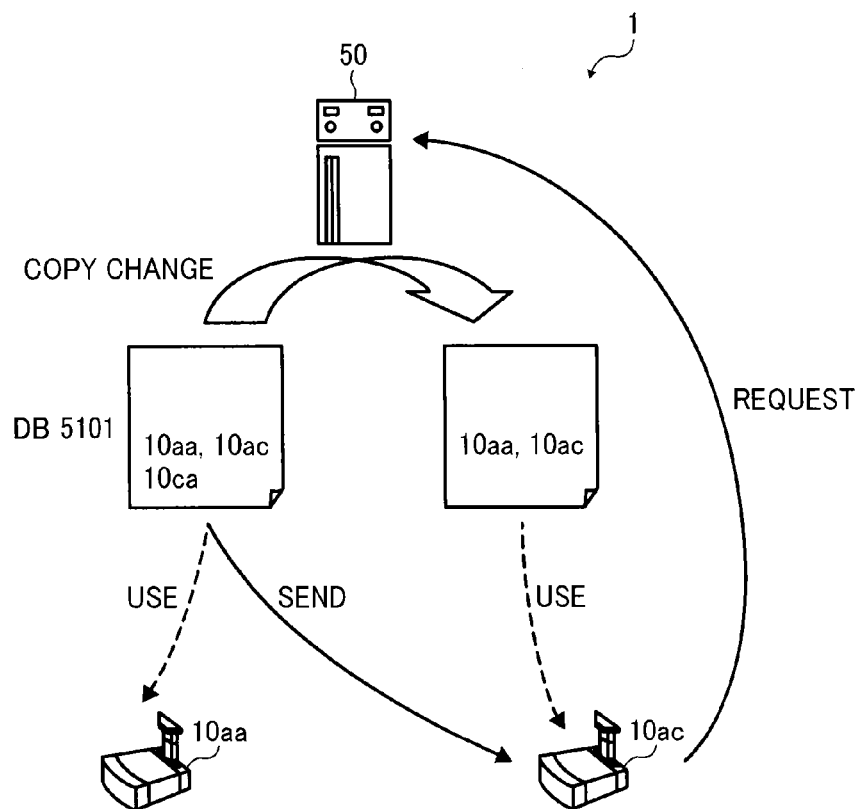
FIG. 10 is an example data structure of a share request management table, managed by the management system of FIG. 5.
FIG. 11 is an illustration for explaining the concept of managing group information in response to a request to share with another terminal, performed by the communication system of FIG. 1.

The memory 5000 further includes a share request management DB 5102, which stores therein a share request management table of FIG. 10. The share request management table of FIG. 10 stores a share request sender terminal ID, a share request destination terminal ID, a group ID, and rule information indicating a rule to be applied to process a share request, in association with one another. The share request sender terminal ID is a terminal ID that identifies the terminal 10 ("share request sender terminal"), which sends a share request to a specific terminal 10 ("share request destination terminal"). The share request requests sharing of group information regarding a specific group, such as a group member list, with the share request destination terminal 10. With the group member list, the share request destination terminal 10 is able to select one or more members belonging to the specific group as a candidate counterpart terminal, with improved efficiency. The share request destination terminal ID is a terminal ID that identifies the share request destination terminal, which is to receive group information regarding the specific group, such as the group member list.

The rule information indicates a rule to be applied, or a process to be performed, to suppress undesired disclosure of information regarding one or more members in the group member list. The group member list that the share request sender terminal 10 wants to share may have information regarding a terminal, which is not registered as the candidate counterpart terminal for the share request destination terminal 10. In such case, it is not preferable to provide information regarding the user who is not registered at the share request destination terminal 10. In view of this, the share request management table of FIG. 10 has rule information indicating a specific rule to be applied, when the member terminal in the group member list that the share request sender terminal 10 wants to share, is not registered as a candidate counterpart terminal of the share request destination terminal 10. More specifically, when the member terminal ID is not stored in the candidate list management table of FIG. 8 as the candidate counterpart terminal ID for the share request destination terminal 10, the management system 50 determines that the member terminal is not registered for the share request destination terminal 10. In such case, the management system 50 determines a process to be performed, according to the rule information. For example, the management system 50 may determine whether to notify a name of the unregistered terminal. In another example, the management system 50 may determine whether to require approval from the user of the unregistered terminal, before registering the member terminal ID to the candidate list management table (FIG. 8) as a candidate counterpart terminal ID for the share request destination terminal 10 (request terminal 10).

In this example, there are basically three rules A, B, and C that are available for selection, when the member terminal ID of the specific group is not registered as the candidate counterpart terminal for the share request destination terminal.

The rule A prohibits notification of the name of the unregistered member terminal. The rule B allows notification of the name of the unregistered member terminal, but requires approval to add the unregistered member terminal as a candidate counterpart terminal, for example, from the unregistered member terminal. The rule C allows notification of the name of the unregistered member terminal, and does not require approval to add the unregistered member terminal as a candidate counterpart terminal.

Information regarding the rules A, B, and C, which indicates specific conditions to be applied, is previously stored in the memory 5000.

(Functional Structure of Management System)

Referring back to FIG. 5, the data transmitter/receiver 51, which may be implemented by the network I/F 209 (FIG. 4) according to an instruction received from the CPU 201, transmits or receives various data or information to or from another terminal, device, or system through the communications network 2.

The authenticator 52, which may be implemented by the instructions from the CPU 201 (FIG. 4), obtains a terminal ID and a password from the login request information that is received from the data transmitter/receiver 51. Using the terminal ID and the password as a search key, the terminal authenticator 52 searches the authentication management DB 5001 (FIG. 6) to determine whether the obtained set of terminal ID and password is registered. Based on the search result, the terminal authenticator 52 determines whether the user at the terminal 10 or the terminal 10 is allowed for access.

The terminal manager 53, which may be implemented by the instructions from the CPU 201 (FIG. 4), manages the operation state of the request terminal 10 that sends the login request information using the terminal management DB 5002 (FIG. 7). More specifically, the terminal manager 53 stores the terminal ID of the request terminal 10, the operation state of the request terminal 10, and the IP address of the request terminal 10, in association with one another. When the power switch 109 is changed from the "ON" state to the "OFF" state by the user, the terminal manager 53 receives the operation state information indicating that the power is turned off from the terminal 10, and changes the operation state of the terminal 10 from the "online" state to the "offline" state in the terminal management table of FIG. 7.

The extractor 54, which may be implemented by the instructions received from the CPU 201 (FIG. 4), extracts various information from the memory 5000. In one example, it is assumed that the user at the request terminal 10 is about to start communication with one or more users who belong to a specific group. In such case, in response to receiving the group ID through the data transmitter/receiver 51 from the request terminal 10, the extractor 54 extracts the member terminal ID, which is associated with the received group ID, from the group data management table of FIG. 9. The extractor 54 searches the candidate list management table of FIG. 8 using the terminal ID of the request terminal 10, to obtain the terminal ID of the candidate counterpart terminal 10 that can communicate with the request terminal 10. Based on a match between the member terminal ID and the candidate counterpart terminal ID, the extractor 54 searches the terminal management table of FIG. 7 using the terminal ID of the candidate counterpart terminal 10 that is also registered as the member terminal, as a search key, to obtain the operation state of the candidate counterpart terminal 10. In this manner, the extractor 54 is able to obtain the operation state of the candidate counterpart terminal 10 that belongs to the specific group and can communicate with the request terminal 10, for each one of the candidate counterpart terminals 10, for display to the terminal 10.

The destination determiner 55, which may be implemented by the instructions from the CPU 201 (FIG. 4), determines whether the member terminal belonging to a specific group has been registered as a candidate counterpart terminal for the request terminal 10 that may start communication with the member terminal. In one example, the destination determiner 55 determines whether the member terminal ID is stored in the candidate list management table of FIG. 8, as a candidate counterpart terminal ID that is associated with a request terminal ID of the request terminal 10.

The notification determiner 56 determines whether to notify the share request destination terminal 10 of the name of the member terminal that is not registered in the candidate list management table (FIG. 8) in association with the share request destination terminal, or whether to require approval to newly register the unregistered terminal to the candidate list management table (FIG. 8) in association with the share request destination terminal, based on the rule information. The notification determiner 56 may be implemented by the instructions from the CPU 201.

The candidate list manager 57, which may be implemented by the instructions from the CPU 201 (FIG. 4), adds or deletes the candidate counterpart terminal ID that is to be associated with the request terminal ID, to or from the candidate list management DB 5003 (FIG. 8).

The share request manager 58, which may be implemented by the instructions received from the CPU 201 of FIG. 4, manages various information regarding the share request using the share request management table (FIG. 10). More specifically, the share request manager 58 may manage each record in the share request management table (FIG. 10), for example, by adding or deleting information such as the share request sender terminal ID and the share request destination terminal ID.

The group data manager 60, which may be implemented by the instructions from the CPU 201, manages various information regarding one or more groups using the group data management table (FIG. 9). More specifically, the group data manager 60 may add or delete, to or from each record, group information such as the group name, group ID, member terminal ID, owner terminal ID, and user terminal ID.

The memory control 59, which operates according to an instruction received from the CPU 201 (FIG. 4) in cooperation with the HDD 205 (FIG. 4), stores various data in the memory 5000 or read out various data from the memory 5000.

<Operation>

Referring to FIG. 11, the concept of processing a request for sharing group information with another terminal, performed by the communication system 1, is explained according to an example embodiment of the present invention.

The management system 50 manages candidate list information for each one of the terminals 10 being managed by the management system 50, using the candidate list management DB 5003, which stores terminal IDs of one or more candidate counterpart terminals 10 in association with the request terminal ID. With the use of candidate list information that may be displayed before the user starts communication, the user at the request terminal 10 can easily select a counterpart terminal to have communication with.

The management system 50 manages group information regarding one or more groups, such as one or more group member lists, using the group data management DB 5101. With the use of group member list, the user at the terminal 10 can select one or more member terminals to have communication with, with improved efficiency. For example, the user may previously store a group member list, which lists one or more member terminals, for a specific group. In this example, it is assumed that the group member list includes the terminal ID 01aa of the member terminal 10aa, the terminal ID 01ac of the member terminal 10ac, and the terminal ID 01ca of the member terminal 10ca, for a specific group owned by the terminal 10aa.

The user may sometimes want to share this group member list with the other user, such as the other member users in that group. However, based on assumption that group member lists differ among different users, simply providing the group member list from the owner user (owner terminal) to the other user (user terminal) does not necessarily encourage the use of such group member list by the other user. For example, the group member list that is provided by the owner terminal may not include the terminal that the user terminal often communicates, or may include the terminal that the user terminal rarely communicates. While the group member list may be modified by the user terminal, such change may not always welcomed by the owner terminal or the other member terminals that share the group member list.

In view of this, as described below, the management system 50 in this example embodiment modifies the contents of the group member list, which is previously stored for the owner terminal, in response to a request from the user terminal that the owner terminal wants to share the group member list. The management system 50 further stores the modified group member list in association with the user terminal, as a group member list owned by the user terminal.

More specifically, it is assumed that the data transmitter/receiver 51 of the management system 50 receives a request ("share request") for sending the group member list to the terminal 10ac, from the terminal 10aa of the user who owns the group member list, according to the management program under control of the CPU 201. The terminal 10aa functions as the share request sender terminal. The terminal 10ca functions as the share request destination terminal.

In response to the share request, which may be received through the management system 50, the share request destination terminal 10ac may send a request for modifying the contents of the group member list that is shared by the owner terminal (share request sender terminal) 10aa, to the management system 50. More specifically, such modification includes the change in the member terminals included in the group member list, which is managed using the group data management DB 5101. For example, such change may be to add or delete one or more member terminals to or from the group member list to be shared. In response to the request, the group data manager 60 of the management system 50 adds or deletes one or more member terminal IDs included in the group member list, to create a new group member list for the share request destination terminal 10ac. The group data management DB 5101 thus stores a list of member terminals, in association with the terminal ID of the terminal 10ac. Through this operation, the group member list may be created for each of the share request destination terminals 10, without changing the contents of the group member list owned by the owner terminal 10aa or owned by the other member terminal.

Alternatively, the data transmitter/receiver 51 of the management system 50 may receive a request for using the group member list without changing its contents, from the share request destination terminal 10ac. In such case, the group data management DB 5101 stores the terminal ID of the terminal 10ac, in association with the group member list. In this manner, the terminal 10ac is able to use the group member list owned by the owner terminal 10aa.

More specifically, the group data management DB 5101 stores the group member list (one or more member terminal IDs of the member terminals), in association with the terminal ID of the owner terminal 10aa, and the terminal ID of the user terminal 10ac. The owner terminal 10 is capable of using and modifying the group member list. The user terminal 10 is capable of using, but not allowed to modify the group member list.

In response to a request for modifying the group member list owned by the terminal 10aa, which may be received at the data transmitter/receiver 51 from the terminal 10ac, the management system 50 manages the modified group member list in association with the owner terminal 10ac (such as the owner terminal ID) using the group data management DB 5101.

In response to a request for using the group member list owned by the terminal 10aa without modification, which may be received at the data transmitter/receiver 51 from the terminal 10ac, the management system 50 manages the group member list in association with the user terminal 10ac (such as the user terminal ID) using the group data management DB 5101.

In the above-described example, the data transmitter/receiver 51 sends the group information, such as the group member list to the terminal 10ac. With this information, the user at the terminal 10ac is able to determine whether to modify the contents of the group member list.

For example, the operation input 12 of the terminal 10ac receives a user input indicating a request for modifying the group member list. In response to the user input, the data transmitter/receiver 11 of the terminal 10ac transmits the request for modifying the group member list, to the management system 50.

More specifically, the operation input 12 of the terminal 10ac receives a user selection that selects whether to modify the group member list. In response to the user selection that selects modifying the group member list, the data transmitter/receiver 11 of the terminal 10ac transmits the request for modifying the group member list to the management system 50. In response to the user selection that selects using the group member list as is, the data transmitter/receiver 11 of the terminal 10ac transmits the request for using the group member list as is to the management system 50.

Figure 12:
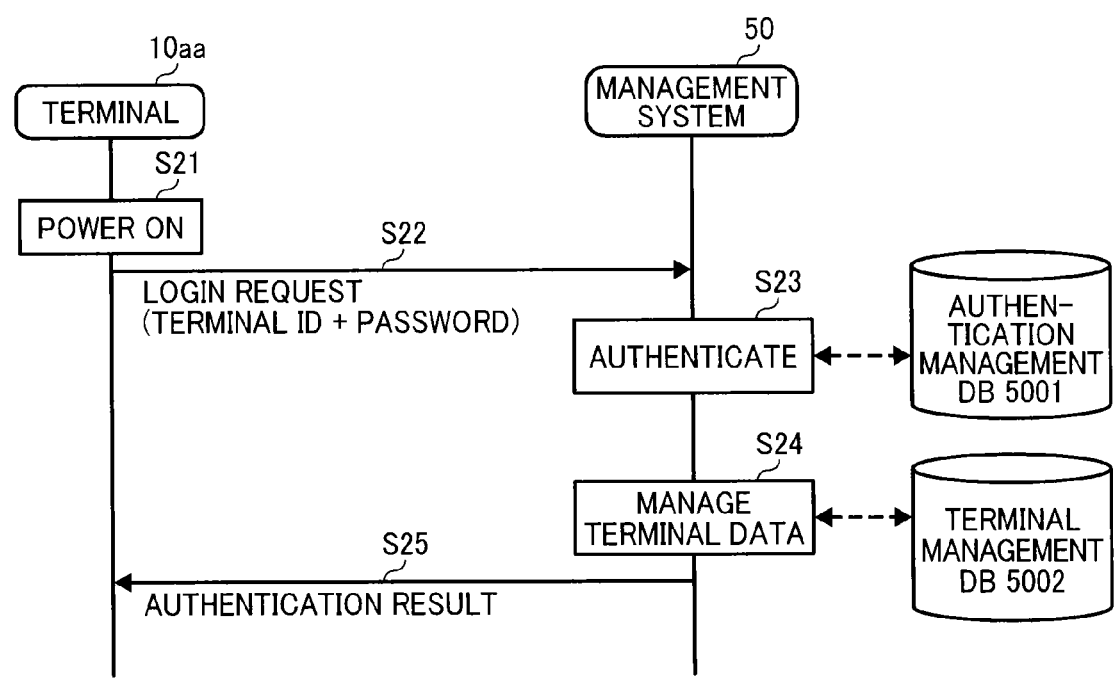
FIG. 12 is a data sequence diagram illustrating operation of processing a login request to the management system of FIG. 5, performed by the communication system of FIG. 1, according to an example embodiment of the present invention.

Referring now to FIGS. 12 to 30, operation of sharing group information such as a group member list is explained according to an example embodiment of the present invention. FIG. 12 is a data sequence diagram illustrating operation of processing a login request transmitted from the terminal 10*aa* to the management system 50, according to an example embodiment of the present invention.

At S21, as the user at the terminal 10*aa* turns on the power switch 109 (FIG. 3), the operation input 12 (FIG. 5) of the terminal 10*aa* receives an instruction for turning on the power, and turns on the power of the terminal 10*aa*.

In response to turning on of the power, at S22, the login request 13 automatically sends login request information to request for logging in, to the management system 50, through the data transmitter/receiver 11 via the communications network 2. The login request information includes the terminal ID that identifies the request terminal 10*aa*, and the password associated with the terminal ID. The terminal ID and the password may be obtained by the memory control 19 from the memory 1000, and sent to the data transmitter/receiver 11. At the time of sending the login request information from the request terminal 10*aa* to the management system 50, the request terminal 10*aa* sends an IP address of the request terminal 10*aa* such that the management system 50 knows the IP address of the request terminal 10*aa*.

At S23, the authenticator 52 of the management system 50 searches the authentication management DB 5001 (FIG. 6) stored in the memory 5000 using the terminal ID and the password of the login request information received through the data transmitter/receiver 51. When it is determined that the terminal ID and the password of the login request information is stored in the authentication management DB 5001, the authenticator 52 determines that the terminal 10*aa* is authenticated.

At S24, when the authenticator 52 authenticates that the login request information is received from the authenticated terminal 10, the terminal manager 53 of the management system 50 stores the operation state and the IP address of the terminal 10*aa*, in association with the terminal ID and the terminal name in the terminal management DB 5002 (FIG. 7) to create a record of the terminal 10*aa*. The terminal management table of FIG. 7 is able to manage the operation state "online" and the IP address "1.2.1.3" in association with the terminal ID "01aa".

At S25, the data transmitter/receiver 51 of the management system 50 sends the authentication result obtained by the authenticator 52 to the request terminal 10*aa* that has sent the login request information through the communications network 2. As described above, in this example, it is assumed that the authenticator 52 determines that the terminal 10*aa* is an authenticated terminal.

Figure 13:
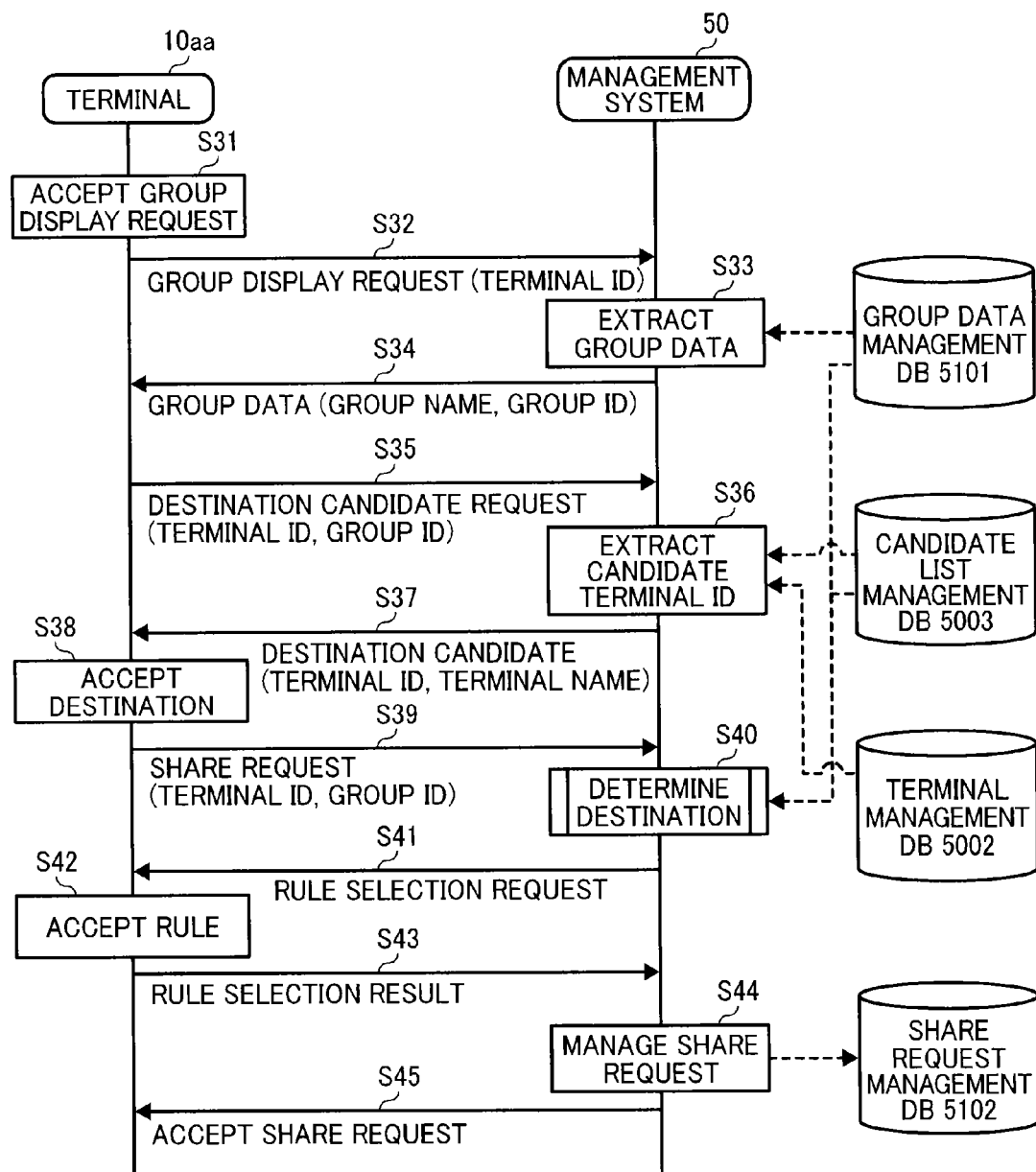
FIG. 13 is a data sequence diagram illustrating operation of sending a share request to share a group member list with a share request destination terminal, performed by the communication system of FIG. 1, according to an example embodiment of the present invention.

Referring to FIG. 13, operation of processing a request ("share request") to share a group member list of a group assigned with the group ID "0001" with a terminal 10*ac*, issued by a terminal 10*aa*, performed by the communication system 1, is explained according to an example embodiment of the present invention.

At S31, the operation input 12 of the request terminal 10*aa* receives a request for displaying group information such as a group name of a group owned by the request terminal 10*aa*, through operations performed on the operation key 108.

In response to the request, at S32, the data transmitter/receiver 11 of the request terminal 10*aa* sends group display request information ("group display request") to the management system 50 through the communications network 2. The group display request information includes the terminal ID "01aa" of the request terminal 10*aa*. The data transmitter/receiver 51 of the management system 50 receives the group display request information.

At S33, the extractor 54 of the management system 50 searches the group data management table (FIG. 9A) using the terminal ID "01aa" included in the group display request information as a search key to obtain a record for the owner terminal ID "01aa". In this example, the extractor 54 obtains the group name "Project A" and the group ID "0001", which are associated with the own terminal ID "01aa", which matches the terminal ID "01aa" of the terminal 10*aa* sending the request. Alternatively, the extractor 54 may further obtain any other information regarding the group, from the group data management table of FIG. 9A.

At S34, the data transmitter/receiver 51 of the management system 50 sends group data including the group name and the group ID, which are extracted at S33, to the request terminal 10*aa* through the communications network 2. The request terminal 10*aa* receives the group data at the data transmitter/receiver 11.

The display control 16 of the terminal 10*aa* generates a group name display screen, which shows a group name of one or more groups owned by the request terminal 10*aa*, based on the group data, and instructs the display 120 (FIG. 3) to display the group name display screen, for example, as illustrated in FIG. 14. FIG. 14 is an example group name display screen, which shows a group name of the group owned by the terminal 10*aa*. In addition to the group name, any other information such as the group ID may be displayed. In this example of FIG. 14, the group name display screen further includes the "SHARE REQUEST" key, which allows sharing of the group member list for that group with another terminal.

Assuming that the user at the request terminal 10*aa* selects the "SHARE REQUEST" key for the selected group on the group name display screen using the operation key 108, the operation input 12 accepts a share request for sharing a member list of the selected group with another terminal.

At S35, the data transmitter/receiver 11 of the request terminal 10*aa* sends a share request destination candidate request ("destination candidate request"), which requests information regarding a candidate to share the group member list, to the management system 50 through the communications network 2. The destination candidate request includes the terminal ID "01aa" of the request terminal 10*aa*, and the group ID of the selected group. In case only one group is available for the request terminal 10*aa*, the group ID may not be sent.

In response to the destination candidate request that is received at the data transmitter/receiver 51 of the management system 50, at S36, the extractor 54 searches the candidate list management table (FIG. 8) using the terminal ID "01aa" included in the destination candidate request as a search key to obtain one or more candidate counterpart terminal IDs, which are associated with the request terminal ID "01aa". The extractor 54 further obtains the name of the terminal that is associated with each one of the candidate counterpart terminal IDs that are extracted, from the terminal management DB 5002 (FIG. 7).

In this example, the extractor 54 extracts the terminal ID "01ab", "01ac", . . . , and "01db" of the candidate counterpart terminals 10*ab*, 10*ac*, . . . , and 10*db*, which are associated with the terminal ID "01aa" of the request terminal 10*ac*, from the candidate list management table of FIG. 8. Further, the extractor 54 extracts the terminal names "Company X, Brach a, Group b", "Company X, Branch a, Group c", . . . , and "Company Y, Branch d, Group b", which are associated with the terminals 10*ab*, 10*ac*, . . . 10*db*, respectively, from the terminal management table of FIG. 7.

In this example, it is assumed that a share request destination candidate is one of candidate counterpart terminals of the request terminal 10*aa*. Alternatively, the share request destination candidate may be any desired one or more of the group member terminals in the group member list. In such case, the extractor 54 searches the group data management DB 5101 of FIG. 9A, using the terminal ID "01aa" as a search key to obtain the member terminal IDs that are associated with the owner terminal ID "01aa".

At S37, the data transmitter/receiver 51 of the management system 50 sends share request destination candidate information ("destination candidate information"), which includes the destination candidate terminal IDs, and the terminal names of the destination candidate terminals, to the terminal 10*aa*. The data transmitter/receiver 11 of the request terminal 10*aa* receives the destination candidate information. As described above, the destination candidate terminal may be any one of candidate counterpart terminals associated with the terminal 10*aa* in the candidate list, and/or the member terminals associated with the terminal 10*aa* in the group member list.

At S38, the display control 16 of the terminal 10*aa* generates a screen including the destination candidate terminal ID and the destination candidate terminal name, which are included in the destination candidate information received from the management system 50, and outputs the screen through the display 120 (FIG. 3), for example, as illustrated in FIG. 15. FIG. 15 is an illustration of a share request destination selection screen, which may be displayed through the display 120*aa*. More specifically, in this example, the member terminals 10*ab*, 10*ac*, and 10*ca* of the group "0001" except for the request terminal 10*aa*, and the counterpart terminals 10*ab*, 10*ac*, and 10*db* for the request terminal 10*aa*, can be displayed.

Assuming that a check box for the terminal name "Company X, Branch a, Group c" of the terminal 10*ac* on the selection screen of FIG. 15 is selected, for example, through the operation key 108, at S38, the operation input 12 accepts the user selection that selects the terminal 10*ac* as a share request destination terminal.

At S39, the data transmitter/receiver 11 of the terminal 10*aa* sends share request information, that is, a share request for requesting to share a group member list with the selected terminal 10*ac*, to the management system 50 through the communications network 2. The share request includes the terminal ID "01aa" of the request terminal 10*aa*, the terminal ID "01ac" of the share request destination terminal 10*ac*, and the group ID "0001" of the group subjected for sharing.

At S40, in response to the share request, which is received at the data transmitter/receiver 51 of the management system 50, the destination determiner 55 determines whether each one of the member terminals of the selected group "0001" is registered as the candidate counterpart terminal for the destination terminal 10*ac*. Based on determination, the destination determiner 55 determines whether to obtain rule information.

Figures 16, 17:
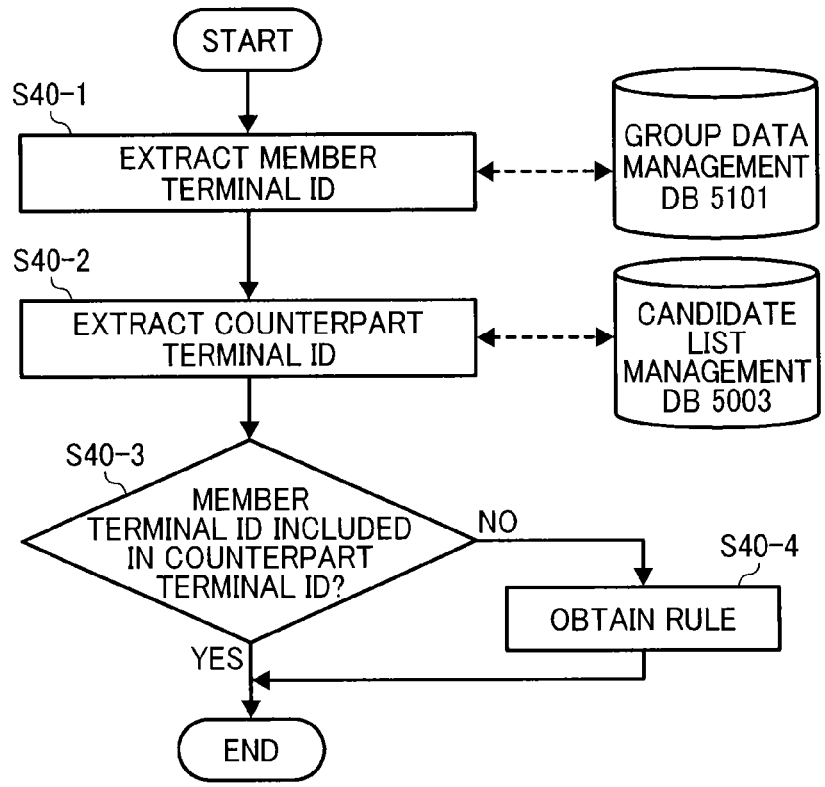
FIG. 16 is a flowchart illustrating operation of determining whether each member terminal in the group member list is registered as a candidate counterpart terminal for the share request destination terminal, and determining whether to obtain rule information, performed by the management system of FIG. 5, according to an example embodiment of the present invention.
FIG. 17 is an illustration of an example rule selection screen.

Referring now to FIG. 16, operation of determining whether each one of the member terminals in the group is registered as a candidate counterpart terminal for the destination terminal, and determining whether to obtain rule information, is explained according to an example embodiment of the present invention.

At S40-1, the extractor 54 searches the group data management table (FIG. 9A) using the group ID "0001" included in the share request, as a search key, to obtain the member terminal IDs "01aa" "01ab" "01ac" and "01ca".

At S40-2, the extractor 54 searches the candidate list management table (FIG. 8) using the terminal ID "01ac" of the share request destination terminal included in the share request, as a search key, to obtain the terminal IDs "01aa" and "01ab" of the candidate counterpart terminals 10*aa* and 10*ab*, which can be requested by the terminal 10*ac* to start communication with.

At S40-3, the destination determiner 55 determines whether terminal IDs "01aa" "01ab" and "01ca" of all member terminals except for the share request destination terminal 10*ac*, are included in the terminal IDs "01aa" and "01ab" of the candidate counterpart terminals 10 for the destination terminal 10*ac* that are extracted by the extractor 54.

When it is determined that all member terminal IDs except for the terminal ID of the share request destination terminal 10*ac* are included in the candidate counterpart terminal IDs ("YES" at S40-3), the operation ends to proceed to S73 of FIG. 25. At S73, the management system 50 updates the group information, such that the group member list can be used by the destination terminal 10*ac*. The operation proceeds directly to S73, as all members in the member list have been already registered as candidate counterpart terminals for the destination terminal 10*ac*.

Referring back to FIG. 16, when it is determined that there is at least one member terminal having the terminal ID that is not included in the candidate counterpart terminal IDs ("NO" at S40-3), the operation proceeds to S40-4. At S40-4, the destination determiner 55 obtains rule information indicating one or more rules that are available for selection, from the memory 5000, and the operation ends to proceed to S41 of FIG. 13.

At S41, the data transmitter/receiver 51 sends a request for selecting a rule to be applied ("rule selection request"), which includes rule information indicating one or more rules for selection, to the terminal 10*aa*. The terminal 10*aa* receives the rule selection request at the data transmitter/receiver 11.

At S42, the display control 16 of the terminal 10*aa* generates a rule selection screen, based on the rule information that is sent with the rule selection request, and displays through the display 120, for example, as illustrated in FIG. 17. FIG. 17 illustrates an example rule selection screen. In response to selection of an arbitrary radio button through the operation key 108, the operation input 12 of the terminal 10*aa* receives a user instruction for selecting a specific rule.

At S43, the data transmitter/receiver 11 of the terminal 10*aa* sends a rule selection result, which includes at least the selected rule, to the management system 50 through the communications network 2. In addition to the selected rule, the terminal 10*aa* may send any other information regarding the share request such as the terminal ID of the share request sender terminal 10*aa*, the terminal ID of the share request destination terminal 10*ac*, and the group ID of the group subjected for sharing, to the management system 50 through the communications network 2. The management system 50 receives the rule selection result at the data transmitter/receiver 51.

At S44, the share request manager 58 of the management system 50 stores the terminal ID of the share request sender terminal, the terminal ID of the share request destination terminal, the group ID, and the selected rule, in the share request management table (FIG. 10).

As registration to the share request management table completes, at S45, the data transmitter/receiver 51 sends information indicating that the share request is accepted, to the terminal 10*aa*.

Referring now to FIG. 18, operation of adding one or more member terminals in the group member list as a candidate counterpart terminal for the share request destination terminal 10ac, performed by the communication system 1, is explained according to an example embodiment of the present invention. In this example, it is assumed that the share request destination terminal 10ac has performed S21 to S25 of FIG. 12 to complete the login process to the management system 50, before starting operation of FIG. 18.

At S51, the data transmitter/receiver 11 of the terminal 10ac sends share request confirmation information, which requests to send information indicating whether there is any share request for the terminal 10ac, to the management system 50 through the communications network 2. The share request confirmation information includes the terminal ID "01ac" assigned to the terminal 10ac. The management system 50 receives the share request confirmation information at the data transmitter/receiver 51.

At S52, the share request manager 58 of the management system 50 searches a share request management table (FIG. 10) using the terminal ID "01ac" as a search key, which is included in the share request confirmation information, to check if there is any share request addressed to the terminal 10ac. When the record is found, the share request manager 58 obtains the share request sender terminal ID "01aa" and the group ID "0001" that are associated with the share request destination terminal ID "01ac".

At S53, the extractor 54 of the management system 50 searches the group data management table (FIG. 9A) using the group ID "0001" as a search key to obtain the group name "Project A" that is associated with the group ID "0001". The data transmitter/receiver 51 transmits share request confirmation result information ("share request confirmation result"), which includes the share request sender terminal ID, the group ID, and the group name, to the terminal 10ac. The terminal 10ac receives the share request confirmation result at the data transmitter/receiver 11.

At S54, the display control 16 of the terminal 10ac generates a share request confirmation screen based on the share request confirmation result, and outputs the share request confirmation screen through the display 120 (FIG. 3), for example, as illustrated in FIG. 19. The share request confirmation screen includes information regarding a share request addressed to the terminal 10ac, such as the share request sender terminal (request terminal), the group name of the group subjected for sharing, and the graphical icons "USE" and "DO NOT USE" that can be selected by the user.

In response to the user selection that selects the "USE" key on the share request confirmation screen of FIG. 19, through the operation key 108, the operation input 12 receives a request for using one or more member terminals in the selected group as a candidate counterpart terminal ("group use request"). At S54, the data transmitter/receiver 11 of the terminal 10ac transmits group use request information ("group use request") to the management system 50 through the communications network 2. The group use request information, which includes the terminal ID "01ac" of the terminal 10ac and the group ID, requests to use one or more member terminals in the selected group as a candidate counterpart terminal for the terminal 10ac. The management system 50 receives the group use request information at the data transmitter/receiver 51.

Figure 20:
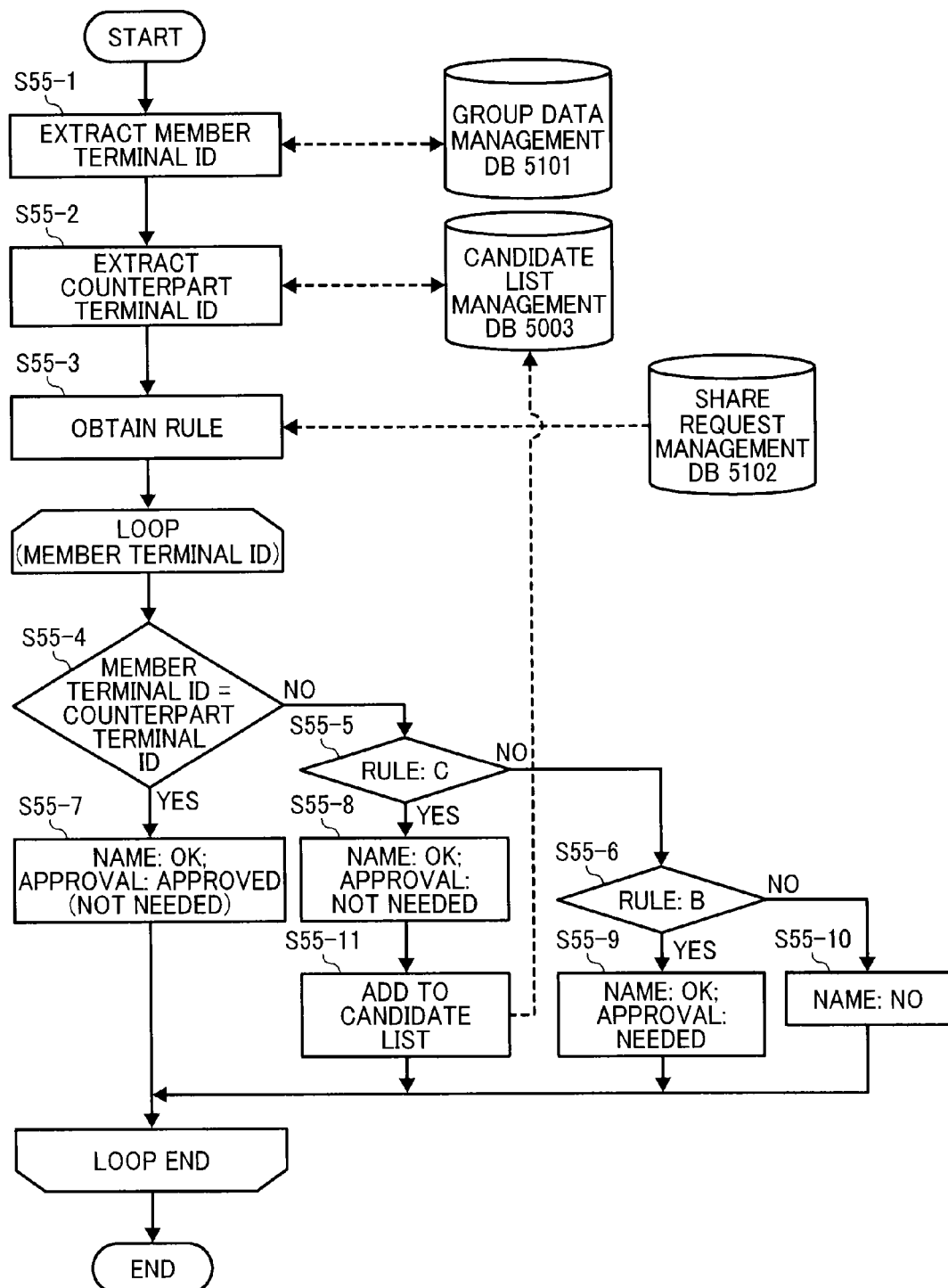
FIG. 20 is a flowchart illustrating operation of determining a process to be applied based on rule information, performed by the management system of FIG. 5, according to an example embodiment of the present invention.

At S55, the destination determiner 55 determines whether each one of the member terminals to be used as a candidate counterpart terminal for the terminal 10ac has been registered in the candidate list management table (FIG. 8) as a candidate counterpart terminal for the terminal 10ac. FIG. 20 is a flowchart illustrating operation of determining whether each member terminal has been registered according to an example embodiment of the present invention.

At S55-1, the extractor 54 searches the group data management table (FIG. 9A) using the group ID "0001" included in the group use request information, as a search key, to obtain the terminal IDs "01aa" "01ab" "01ac" and "01ca" of the member terminals 10aa, 10ab, 10ac, and 10ca of the group "0001".

At S55-2, the extractor 54 searches the candidate list management table (FIG. 8) using the terminal ID "01ac" that sends the group use request, which is included in the group use request information, as a search key to obtain the terminal IDs "01aa" and "01ab" of the candidate counterpart terminals 10 that are associated with the terminal ID "01ac" of the terminal 10ac.

At S55-3, the extractor 54 searches the share request management table (FIG. 10) using the terminal ID "01ac" and the group ID "0001" included in the group use request, as a search key, to obtain rule information that is associated with the share request destination terminal ID "01ac" and the group ID "0001".

For each one of the member terminal IDs "01aa", "01ab", and "01ca" of the member terminals except for the destination terminal ID "01ac", the management system 50 performs S55-4 to S55-10.

At S55-4, the destination determiner 55 determines whether the member terminal ID matches any one of the candidate counterpart terminal IDs "01aa" and "01ab" for the terminal 10ac. More specifically, the destination determiner 55 determines whether the member terminal in the group member list has been registered as a candidate counterpart terminal for the request terminal 10ac in the candidate list management table (FIG. 8).

In this example, the destination determiner 55 determines that the terminal IDs "01aa" and "01ab" are registered as a candidate counterpart terminal ID for the terminal 10ac, and that the terminal ID "01ca" is not registered as a candidate counterpart terminal ID for the terminal 10ac.

When the destination determiner 55 determines that the member terminal ID in the group member list matches the candidate counterpart terminal ID ("YES" at S55-4), the operation proceeds to S55-7.

At S55-7, the notification determiner 56 determines that the name of the registered member terminal can be notified to the destination terminal 10ac, and approval to add the member terminal as a candidate counterpart terminal is not necessary, as there is no need to newly register the member terminal.

When the destination determiner 55 determines that the member terminal ID in the group member list does not match the candidate counterpart terminal ID ("NO" at S55-4), at S55-5, the destination determiner 55 determines whether the rule to be applied, which is obtained at S55-3, is the rule C.

When the destination determiner 55 determines that the obtained rule is the rule C ("YES" at S55-5), at S55-8, the notification determiner 56 determines that the name of the unregistered member terminal can be notified to the destination terminal 10ac, and approval to add the member terminal as a candidate counterpart terminal is not necessary, according to the rule C. In such case, the candidate list manager 57 registers the unregistered member terminal to the candidate list management DB 5003 (FIG. 8), as a candidate counterpart terminal for the request terminal 10ac. More specifically, the candidate list manager 57 stores the unregistered member terminal ID in association with the request terminal ID "01ac".

When the destination determiner 55 determines that the obtained rule is not the rule C ("NO" at S55-5), the operation proceeds to S55-6. At S55-6, the destination determiner 55 determines whether the obtained rule is the rule B.

When the destination determiner 55 determines that the obtained rule is the rule B ("YES" at S55-6), at S55-9, the notification determiner 56 determines that the name of the unregistered member terminal can be notified to the destination terminal 10ac, and that approval to add the unregistered member terminal is required according to the rule B.

When the destination determiner 55 determines that the obtained rule is not the rule B ("NO" at S55-6), that is, the obtained rule is the rule A in this example, at S55-10, the notification determiner 56 determines that the name of the unregistered member terminal cannot be notified to the destination terminal 10ac. In such case, approval is not required as the unregistered member terminal will not be registered.

Assuming that the approval determiner 55 determines, for all member terminals in the group member list except for the destination terminal 10ac, whether to notify the name of the member terminal, and whether to require approval to add the member terminal, the operation of FIG. 20 ends to proceed to S56 of FIG. 18.

At S56, the extractor 54 searches the terminal management table (FIG. 7) using the member terminal ID having the terminal name that can be notified, as a search key, to obtain the terminal name.

At S57, the data transmitter/receiver 51 of the management system 50 transmits group member information to the destination terminal 10ac, which sends the group use request. The group member information includes the member terminal ID and the terminal name of the member terminal that can be notified, and the determination result indicating whether approval from the member terminal is required ("approval determination result"). The destination terminal 10ac receives the group member information at the data transmitter/receiver 11.

At S58, the display control 16 of the terminal 10ac generates a member list screen including names of one or more member terminals that can be notified, and the approval determination result ("approval status") for each of the member terminals, based on the group member information received from the management system 50. The display control 16 further causes the display 120 (FIG. 3) to output the member list screen, for example, as illustrated in any one of FIGS. 21 to 23.

FIG. 21 illustrates a member list screen, which is generated at S58 of FIG. 18, when the rule A is selected at the terminal 10aa at S42 of FIG. 13. In this example, the member terminals 10aa and 10ab are registered as a candidate counterpart terminal, and the terminal 10ca is not registered as a candidate counterpart terminal. According to the rule A, only the name of the registered terminal 10 is displayed. In such case, the unregistered member terminal 10ca will not be registered as a candidate counterpart terminal for the destination terminal 10ac.

FIG. 22 illustrates a member list screen, which is generated at S58 of FIG. 18, when the rule B is selected at the terminal 10aa at S42 of FIG. 13. According to the rule B, the name of the member terminal is notified even when the member terminal is not registered as a candidate counterpart terminal for the destination terminal 10ac, but approval to add the unregistered member terminal as a candidate counterpart terminal is required. In this example of FIG. 22, the "approval request" icon is displayed in association with the unregistered member terminal 10ca that requires approval.

FIG. 23 illustrates a member list screen, which is generated at S58 of FIG. 18, when the rule C is selected at the terminal 10aa at S42 of FIG. 13. According to the rule C, the name of the member terminal is notified even when the member terminal is not registered as a candidate counterpart terminal for the destination terminal 10ac, and approval to add the unregistered member terminal as a candidate counterpart terminal is not required. In such case, the unregistered terminal 10ca will be registered as a candidate counterpart terminal for the destination terminal 10ac, without approval from the terminal 10ca.

Referring to FIG. 24, operation of processing a request to obtain approval to add the unregistered member terminal as a candidate counterpart terminal, performed by the communication system 1, is explained according to an example embodiment of the present invention. The operation of FIG. 24 is performed, for example, when the user at the destination terminal 10ac selects the "approval request" icon of the member list screen of FIG. 22.

At S61, the operation input 12 of the terminal 10ac receives an approval request, which requests approval from the terminal 10ca to add the unregistered member terminal 10ca as a candidate counterpart terminal for the terminal 10ac.

At S62, the data transmitter/receiver 11 of the terminal 10ac transmits approval request information ("approval request") to the management system 50 through the communications network 2. The approval request information includes the terminal ID "01ac" of the approval request sender terminal 10ac, and the terminal ID "01ca" of the approval request destination terminal 10ca. The management system 50 receives the approval request at the data transmitter/receiver 51.

At S63, the data transmitter/receiver 51 of the management system 50 transmits the approval request information to the approval request destination terminal 10ca. The approval request information includes the terminal ID "01ac" of the approval request sender terminal 10ac, and the terminal ID "01ca" of the approval request destination terminal 10ca. As described above, the approval request requests the terminal 10ca to approve addition of the terminal 10ca as a candidate counterpart terminal for the terminal 10ac. The terminal 10ca receives the approval request information at the data transmitter/receiver 11.

The terminal 10ca may request the user to approve or not to approve registration of the approval request destination terminal 10ca as a candidate counterpart terminal for the approval request sender terminal 10ac.

In response to a user input through the operation key 108, at S64, the operation input 12 of the terminal 10ca receives approval to add the terminal 10ca as a candidate counterpart terminal for the terminal 10ac.

At S65, the data transmitter/receiver 11 of the terminal 10ca transmits approval information, which indicates approval to add the terminal 10ca as a candidate counterpart terminal for the terminal 10ac, to the management system 50. The approval information includes the terminal ID "01ac" of the approval request sender terminal 10ac, and the terminal ID "01ca" of the approval request destination terminal 10ca. The management system 50 receives the approval information at the data transmitter/receiver 51.

At S66, the candidate list manager 57 of the management system 50 stores the terminal ID "01ca" of the terminal 10ca in association with the terminal ID "01ac" of the request terminal 10ac, in the candidate list management table (FIG. 8).

At S67, the data transmitter/receiver 51 of the management system 50 transmits approval result information ("approval result"), which indicates approval to add the terminal 10*ca* as a candidate counterpart terminal for the terminal 10*ac*, to the terminal 10*ac*. The approval result includes the terminal ID "01ac" of the approval request sender terminal 10*ac*, and the terminal ID "01ca" of the approval request destination terminal 10*ca*.

Referring now to FIG. 25, operation of managing group information regarding the group subjected for sharing is explained according to an example embodiment of the present invention. The operation of FIG. 25 may be performed, after displaying the member list screen. In case the approval request is required, the operation of FIG. 25 may be performed after completion of operation of FIG. 24.

The terminal 10*ac* may request the user to select whether to use the group information as it is, or make a copy of the group information, for example, as described below. In this example, the group information may be any information related to the group shared with the terminal 10*aa*, such as the group name that is notified (FIG. 19) or the name of the member terminal (FIGS. 21 to 23).

The display control 16 of the terminal 10*ac* generates a group data use request screen ("use request screen") based on the group information, and displays the use request screen through the display 120 (FIG. 3), for example, as illustrated in FIGS. 26 and 27. FIGS. 26 and 27 illustrate an example use request screen, which may be displayed on the display 120. For the descriptive purposes, the screens illustrated in FIGS. 26 and 27 illustrate the example case in which the unregistered member terminal 10*ca* is notified.

In this example, FIG. 26 illustrates an example use request screen, which may be selected by the user when the group information is used as it is. FIG. 27 illustrates an example use request screen, which may be selected by the user when the group information is used after modification, that is, when a copy of the group information is to be generated. The user may select one of the screens of FIGS. 26 and 27, for example, through selecting a tab. Assuming that the screen of FIG. 27 is selected, the user may change the group name, or may select a member terminal to be deleted from the group member list to be created, through the operation key 108.

In response to the user input that selects the "save" key in FIG. 26 or 27, at S71 (FIG. 25), the operation input 12 of the terminal 10*ac* receives the user instruction regarding the selected use option indicating whether to use the group information as it is or after modification. In case the selected use option indicates that the group information is to be modified, the user instruction further includes the selected member terminal to be deleted, and the group name that is input by the user.

At S72, the data transmitter/receiver 11 of the terminal 10*ac* transmits use request information including at least the group ID of the group information to be used, and the selected use option, to the management system 50. In case the selected use option indicates that the group information is to be modified, the use request information further includes the terminal ID of the member terminal to be deleted, and the group name that is input. The data transmitter/receiver 51 of the management system 50 receives the use request information.

In addition or in alternative to the terminal ID of the member terminal to be deleted, the use request information may include the terminal ID of the terminal to be added to the group member list, for example, when the user instruction includes the terminal to be added.

At S73, the group data manager 60 of the management system 50 updates the group data management table (FIG. 9A) with various information obtained from the use request information.

Figure 28:
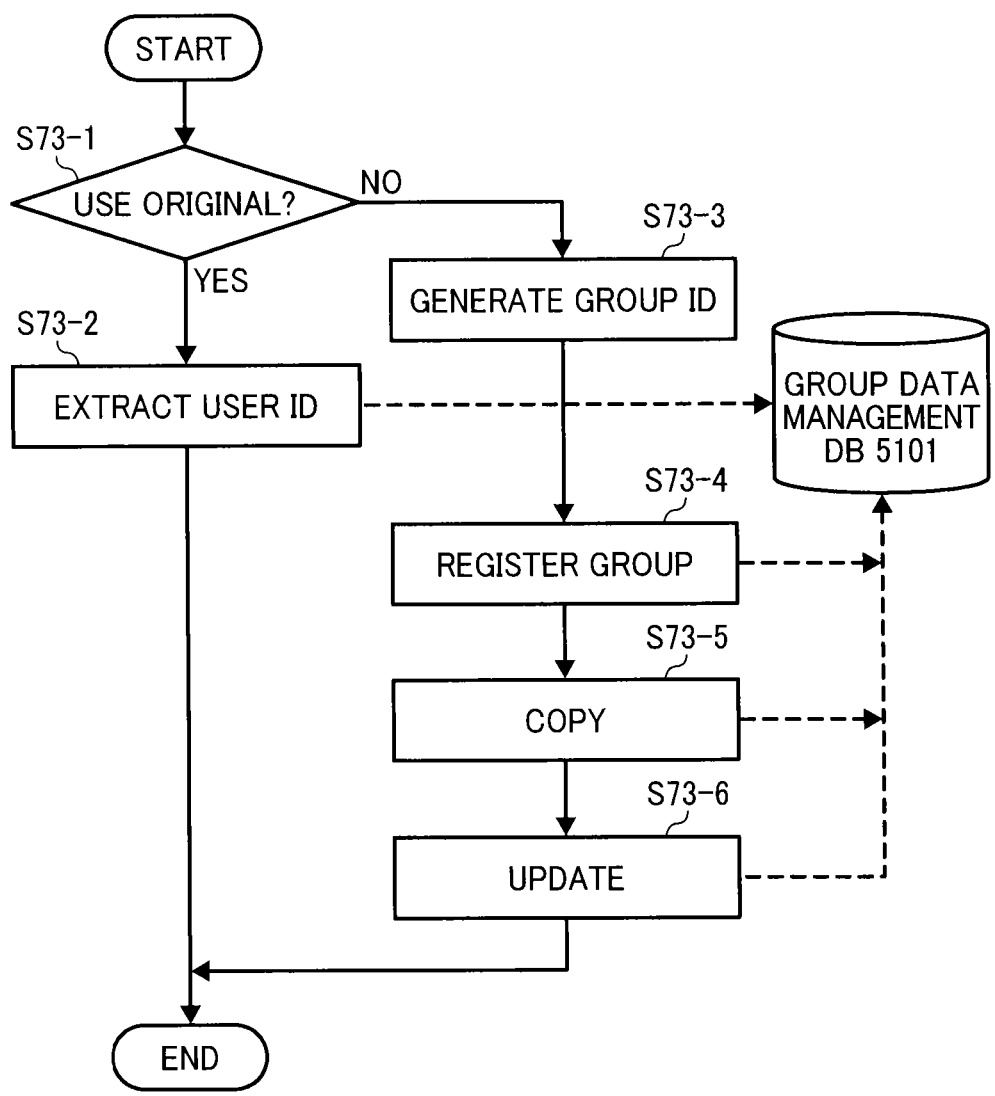
FIG. 28 is a flowchart illustrating operation of updating the group data management table, performed by the management system of FIG. 5, according to an example embodiment of the present invention.

Referring to FIG. 28, operation of updating the group data management table is explained according to an example embodiment of the present invention.

At S73-1, the group data manager 60 determines whether the use option included in the use request information, which is received at the data transmitter/receiver 51, indicates to use the group information as it is ("use original") or to use the group information after modification. When it is determined that the original group information is used ("YES" at S73-1), the operation proceeds to S73-2.

At S73-2, the group data manager 60 updates the group data management table of FIG. 9A to the group data management table of FIG. 9B, by adding the terminal ID "01ac" of the terminal 10*ac* that sends the use request information in the "user terminal ID" field associated with the group ID "0001" included in the use request information.

When it is determined that the original group information is not used ("NO" at S73-1), that is, when the group information is to be used after modification, the operation proceeds to S73-3.

At S73-3, the group data manager 60 generates a new group ID "0003", which uniquely identifies a group that is created by the owner terminal 10*ac* based on the group information of the group "0001".

At S73-4, the group data manager 60 registers the group "0003" to the group data management table of FIG. 9A, as illustrated in FIG. 9C. More specifically, the group data manager 60 stores the terminal ID "01ac" of the terminal 10*ac* that sends the use request information as the owner terminal ID associated with the newly created terminal ID "0003".

At S73-5, the group data manager 60 refers to the group information for the group "0001" to copy the group name "Project A" and the member terminal IDs "01aa" "01ab" "01ac" and "01ca", respectively, to the fields "group name" and "member terminal ID".

At S73-6, the group data manager 60 determines whether any modification to the group information that is copied is necessary, using the group request information. Assuming that the group name is to be modified, and the member terminal ID "01ca" is to be deleted, as illustrated in FIG. 9C, the group data manager 60 updates the group name "Project A" to the modified group name "Project A (Company X)", and deletes the member terminal ID "01ca" from the member terminal ID field.

In response to completion of updating the group data management table, the share request manager 58 determines that the share request, which is requested by the terminal 10*aa* to the terminal 10*ac*, is complete, and the operation proceeds to S74 (FIG. 25). At S74, the share request manager 58 updates the share request management table (FIG. 10) to delete a record, which is associated with the share request destination terminal ID "01ac", which is the terminal ID "01ac" of the terminal 10*ac* that sends the use request information.

At S75, the data transmitter/receiver 51 of the management system 50 transmits notification indicating that completion of process requested by the use request information to the terminal 10*ac*.

Through operation of FIG. 25, the user at the share request destination terminal 10 may modify the group information such as the group member list to register its own group member list based on the group information shared by the share request sender terminal 10.

As described above, the candidate counterpart terminals 10 that the terminal 10ac can request for communication are those terminals that are previously registered to the candidate list management table of FIG. 8 in association with the terminal ID "01ac" of the terminal 10ac. In response to the share request, which is requested by the share request sender terminal 10aa for the terminal 10ac, the member terminal IDs of the group to be shared "0001" can be added to the candidate list management table (FIG. 8) as a candidate counterpart terminal for the terminal 10ac. Further, the group data management table (FIG. 9) may be updated to add the terminal 10ac as a user terminal capable of using the group information of the group "0001" (FIG. 9B), or to create group information for the terminal 10ac (FIG. 9C). Using the group information, such as the group member list, the terminal 10ac is able to select a counterpart terminal to start communication with improved efficiency.

Figure 29:
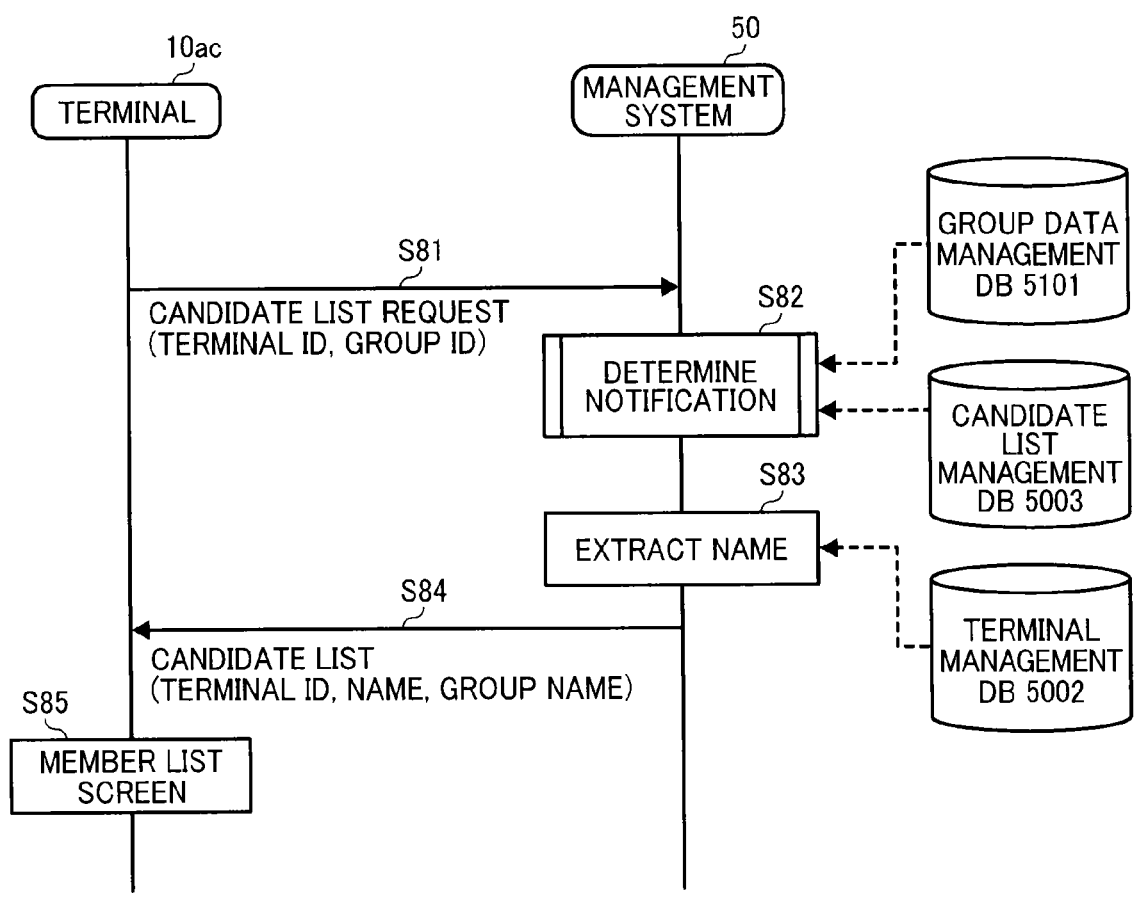
FIG. 29 is a data sequence diagram illustrating operation of processing a request for displaying information regarding a candidate of a counterpart terminal in a group, performed by the communication system of FIG. 1, according to an example embodiment of the present invention.

Referring to FIG. 29, operation of processing a request for information regarding a candidate counterpart terminal based on the group information such as the group member list, performed by the communication system 1, is explained according to an example embodiment of the present invention.

At S81, the data transmitter/receiver 11 of the terminal 10ac transmits candidate list request information ("candidate list request") to the management system 50 through the communications network 2. In this example, the candidate list request requests for candidate list information indicating one or more member terminals of a specific group that can be requested for communication. For example, the candidate list request includes the group ID that identifies the selected group, and the terminal ID of the terminal 10ac. The user at the terminal 10ac may select any one of the groups that are owned by the terminal 10ac or allowed for use by the terminal 10ac. The management system 50 receives the candidate list request at the data transmitter/receiver 51.

Figure 30:
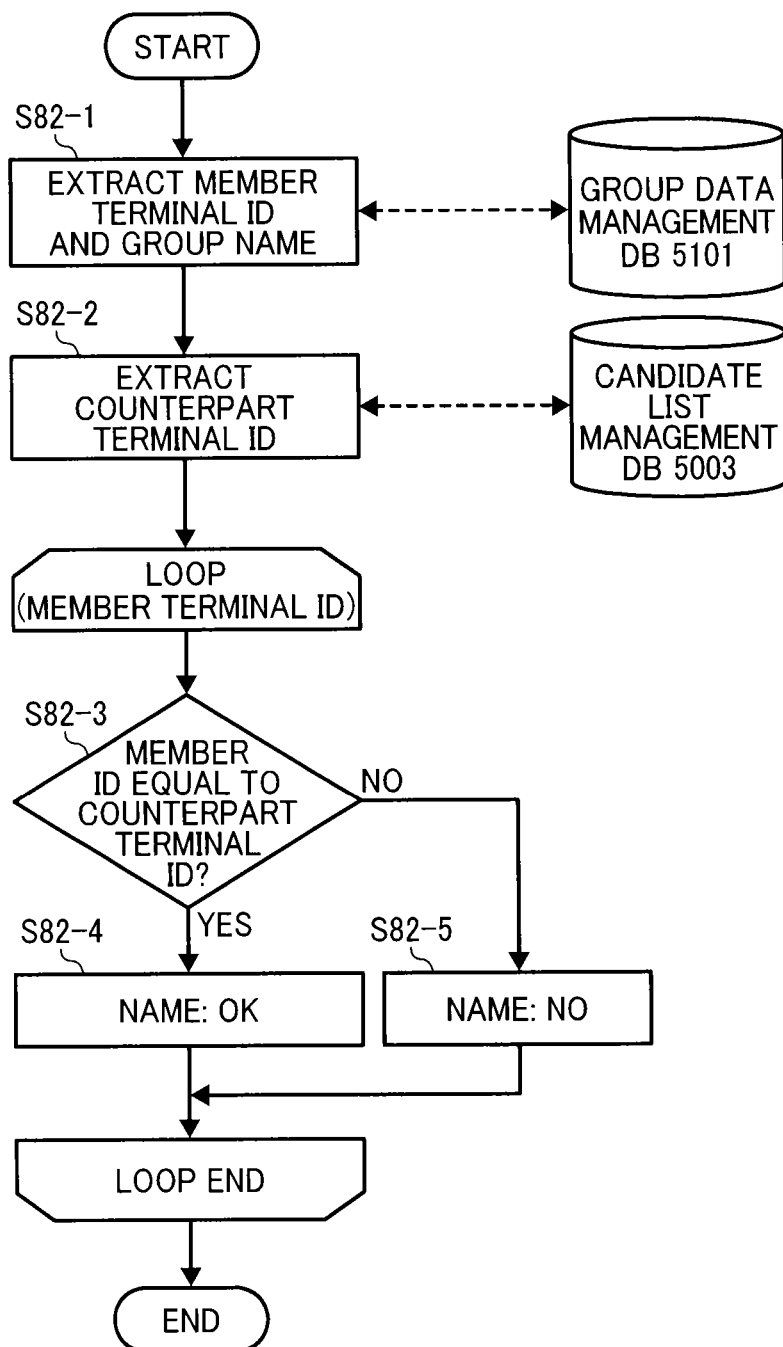
FIG. 30 is a flowchart illustrating operation of determining information to be included in the information to be displayed, performed by the management system of FIG. 5, according to an example embodiment of the present invention.

At S82, the management system 50 determine whether to notify the name of the member terminal, for example, as illustrated in FIG. 30.

FIG. 30 is a flowchart illustrating operation of determining whether to notify the name of the member terminal, performed by the management system 50, according to an example embodiment of the present invention.

At S82-1, the extractor 54 searches the group data management table (FIG. 9) using the group ID included in the candidate list request, as a search key, to obtain the member terminal IDs and the group name.

At S82-2, the extractor 54 searches the candidate list management table (FIG. 8) using the terminal ID "01ac" included in the candidate list request, as a search key, to obtain one or more candidate counterpart terminal IDs associated with the request terminal ID "01ac".

S82-3 to S82-5 are performed for each one of the member terminal IDs that are extracted, except for the terminal ID "01ac" of the terminal 10ac that requests for candidate list information.

At S82-3, the destination determiner 55 determines whether the member terminal ID extracted at S82-1 matches any one of the candidate counterpart terminal IDs extracted at S82-2.

When it is determined that the member terminal ID matches the candidate counterpart terminal ID ("YES" at S82-3), the operation proceeds to S82-4. At S82-4, the notification determiner 56 determines that the name of the member terminal can be notified to the terminal 10ac.

As described above, even when the member terminal is not registered at least at the time when the share request is sent, as long as the rule C is selected to be applied, the candidate list table is updated to include the member terminal as a candidate counterpart terminal for the terminal 10ac. In such case, the name of the member terminal is notified.

In another example, even when the member terminal is not registered at least at the time when the share request is sent, as long as the rule B is selected to be applied and approval to add that member terminal is obtained, the candidate list table is updated to include the member terminal as a candidate counterpart terminal for the terminal 10ac (S66). In such case, the name of the member terminal is notified to the terminal 10ac.

When it is determined that the member terminal ID does not match any one of the candidate counterpart terminal IDs ("NO at S82-3), the operation proceeds to S82-5. At S82-5, the notification determiner 56 determines that the name of the member terminal cannot be notified to the terminal 10ac.

For example, when the member terminal is not registered at least at the time when the share request is sent, and that approval to add that member terminal is not obtained when the rule B is applied, the member terminal is not registered to the candidate list management table. In such case, the name of the member terminal is not notified to the terminal 10ac.

In another example, when the member terminal is not registered at least at the time when the share request is sent, as long as the rule A is applied, the candidate list management table is not updated to at least include the member terminal ID. In such case, the name of the member terminal is not notified to the terminal 10ac.

After completion of determination of whether to notify the name of the member terminal for each one of the member terminals as illustrated in FIG. 30, at S83 (FIG. 29), the extractor 54 searches the terminal management table (FIG. 7) using the member terminal ID of the terminal having the name that can be notified, as a search key, to obtain the name of the member terminal.

At S84, the data transmitter/receiver 51 transmits candidate list information ("candidate list") to the terminal 10ac. The candidate list includes the terminal ID and the terminal name of the member terminal that notification is allowed, the group ID, and the group name. The terminal 10ac receives the candidate list at the data transmitter/receiver 11.

At S85, the display control 16 of the terminal 10ac generates a member list screen based on the candidate list information, and outputs the member list screen through the display 120. The member list screen includes the group name of the selected group, and the name of the member terminal that can be notified.

Using the member list screen, the user at the terminal 10ac is able to select one or more of the counterpart terminals 10 to start communication, or all member terminals in the specific group at once. In response to the user input that selects the counterpart terminal through the operation input 12, the data transmitter/receiver 11 of the terminal 10ac transmits a communication start request to the management system 50, which requests to start communication with the selected counterpart terminal. The communication start request includes the terminal ID "01ac" of the terminal 10ac, and the terminal ID of the counterpart terminal.

In response to the communication start request, the management system 50 controls connection at least between the terminal 10ac and the counterpart terminal 10, for example, under control of the CPU 201. The terminal 10ac and the counterpart terminal 10 establish a communication session through the relay device 30 to transmit or receive various data such as image data and sound data, using any desired method, for example, as described in the description related to FIGS. 2 and 3A to 3C of U.S. Patent Application Publication No. 2013-0223292, the contents of which is incorporated herein by reference.

Figure 31:
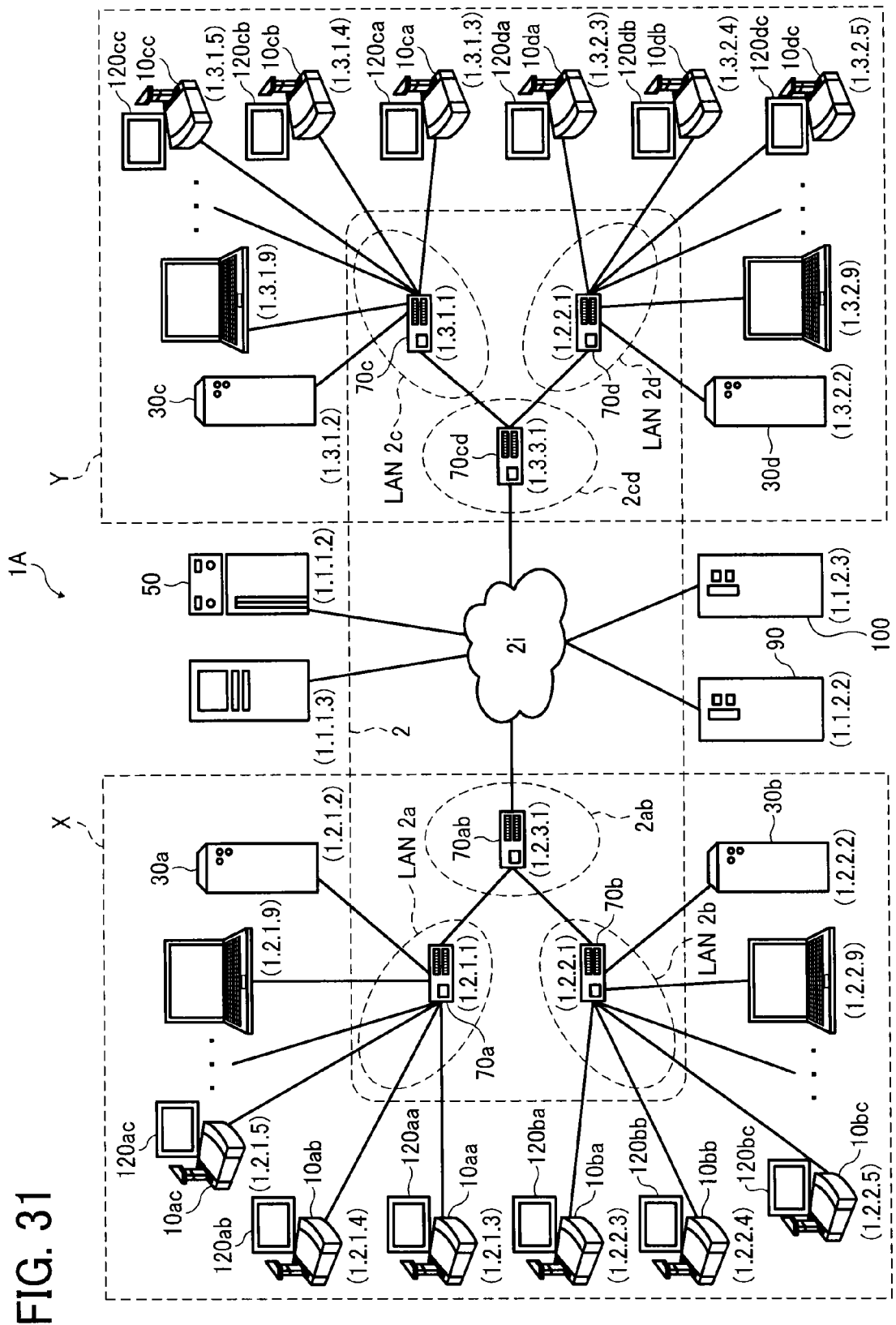
FIG. 31 is a schematic diagram illustrating a configuration of a communication system according to an example embodiment of the present invention.

Referring now to FIGS. 31 to 35, a communication system 1A is explained according to an example embodiment of the present invention. FIG. 31 illustrates a configuration of the communication system 1A, which is substantially similar in structure and function to the communication system 1 of FIG. 1, except for some differences. The differences include the addition of a plurality of user personal computers (PC) 20a, 20b, 20c, and 20d, and a communication terminal management system 80. For the descriptive purposes, any number of the plurality of user PCs 20a, 20b, 20c, and 20d may be collectively or each referred to as the user PC 20. In this example, the user at the user PC 20 may be a user at the terminal 10 who may own the group, or an administrator that can manage information regarding the terminal 10 such as the group information.

In response to the user input, the user PC 20 transmits a request to the communication terminal management system 80. The user PCs 20a, 20b, 20c, and 20d are connected to the LAN 2a, 2b, 2c, and 2d, respectively. The user PC 20 has a hardware structure that is substantially similar to the hardware structure of the management system 50 as described above referring to FIG. 4.

The communication terminal management system 80 processes the request received from the user PC 20. The communication terminal management system 80 is connected to the terminal 10, and the user PC 20, through the communications network 2 such as the Internet 2i. The communication terminal management system 80 may be implemented by at least one computer having a hardware structure that is substantially similar to the hardware structure of the management system 50 as described above referring to FIG. 4.

Figure 32:
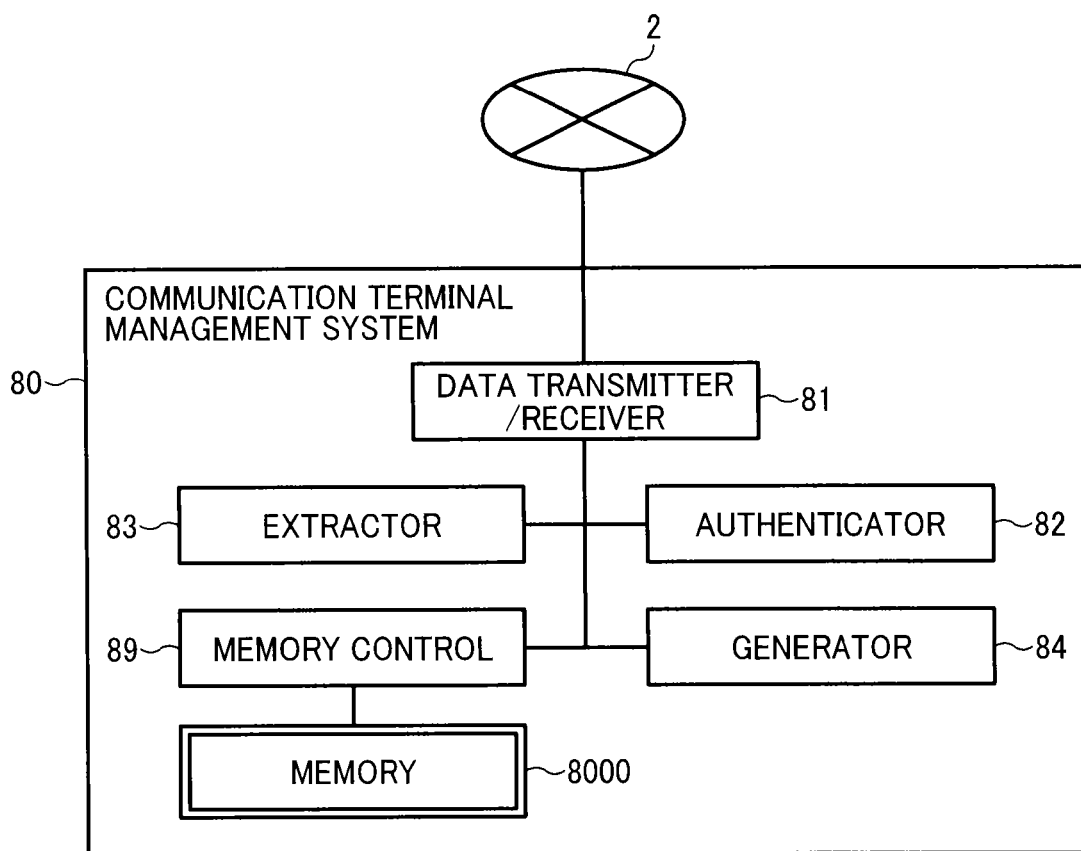
FIG. 32 is a schematic diagram illustrating a functional structure of a communication terminal management system of FIG. 31, according to an example embodiment of the present invention.

FIG. 32 illustrates a functional structure of the communication terminal management system 80 according to an example embodiment of the present invention. The communication terminal management system 80 includes a data transmitter/receiver 81, an authenticator 82, an extractor 83, a generator 84, and a memory control 89. In this example, the operations or functions that are performed by the communication terminal management system 80, which include the operations or functions performed by the functional elements shown in FIG. 32, are performed in cooperation with one or more hardware devices that are shown in FIG. 4. More specifically, these elements shown in FIG. 32 correspond to a plurality of functions or functional modules, which are executed according to an instruction of the CPU 201 (FIG. 4) that is generated according to the communication terminal management program being loaded from the flash memory 204 onto the RAM 203. The communication terminal management system 80 further includes a memory 8000, which may be implemented by the RAM 203 or the HD 204 of FIG. 4. The memory control 89 reads or writes various data with respect to the memory 8000.

In this example, the data transmitter/receiver 81 of the communication terminal management system 80 receives the group member list from the management system 50. The generator 84 of the communication terminal management system 80 generates display data, such as a HTML (hypertext markup language) document, which allows the user to select one or more counterpart terminals from a list of candidate counterpart terminals, which is generated based on the group member list and the candidate list. As described above referring to FIG. 13, the candidate counterpart terminal may be any one of the candidate counterpart terminals registered in the candidate list management table for the request terminal, and the member terminals in the group member list.

The data transmitter/receiver 81 of the communication terminal management system 80 transmits the HTML document to a user terminal such as the user PC 20. The user PC 20 may display a share request destination screen based on the HTML document received from the communication terminal management system 80, for example, as illustrated in FIG. 15.

The data transmitter/receiver 81 further receives a user instruction for selecting one or more candidate terminals, as a share request destination terminal that the user PC 20 wants to share the group member list. The data transmitter/receiver 81 of the communication terminal management system 80 sends a request relating to sharing of the group member list, to the terminal 10 that is selected as the share request destination terminal, to the management system 50. Through the user PC 20, the user, who may feel uncomfortable to operate the terminal 10, can easily send various requests such as a share request to the management system 50, without requiring to use the terminal 10.

The data transmitter/receiver 81, which may be implemented by the network I/F 209 (FIG. 4) according to the instructions received from the CPU 201 (FIG. 4), transmits or receives various data or information to or from another terminal, device, or system, through the communications network 2. The data transmitter/receiver 81 may be provided with the web server function or the data processing function.

The authenticator 82, which may be implemented by the instructions from the CPU 201 (FIG. 4), may access the management system 50 to search the authentication management DB 5001 (FIG. 6) stored in the memory 5000 to determine whether the terminal ID and the password of the terminal 10, which is operated by the user at the user PC 20, have been registered. Based on search, the authenticator 82 determines whether the user at the user PC 20, who is allowed to use the terminal 10, or the user PC 20 operated by the user, is allowed for access.

The extractor 83, which may be implemented by the instructions received from the CPU 201 (FIG. 4), access the management system 50 to search the candidate list management DB 5003 (FIG. 8) stored in the memory 5000, using the terminal ID of the request terminal 10, to obtain the terminal ID of the candidate counterpart terminal 10 associated with the request terminal ID.

The generator 84, which may be implemented by the instructions received from the CPU 201 (FIG. 4), generates display data, such as a HTML document, for display through the user PC 20. The HTML document may be displayed using the web browser installed on the user PC 20.

Figure 33:
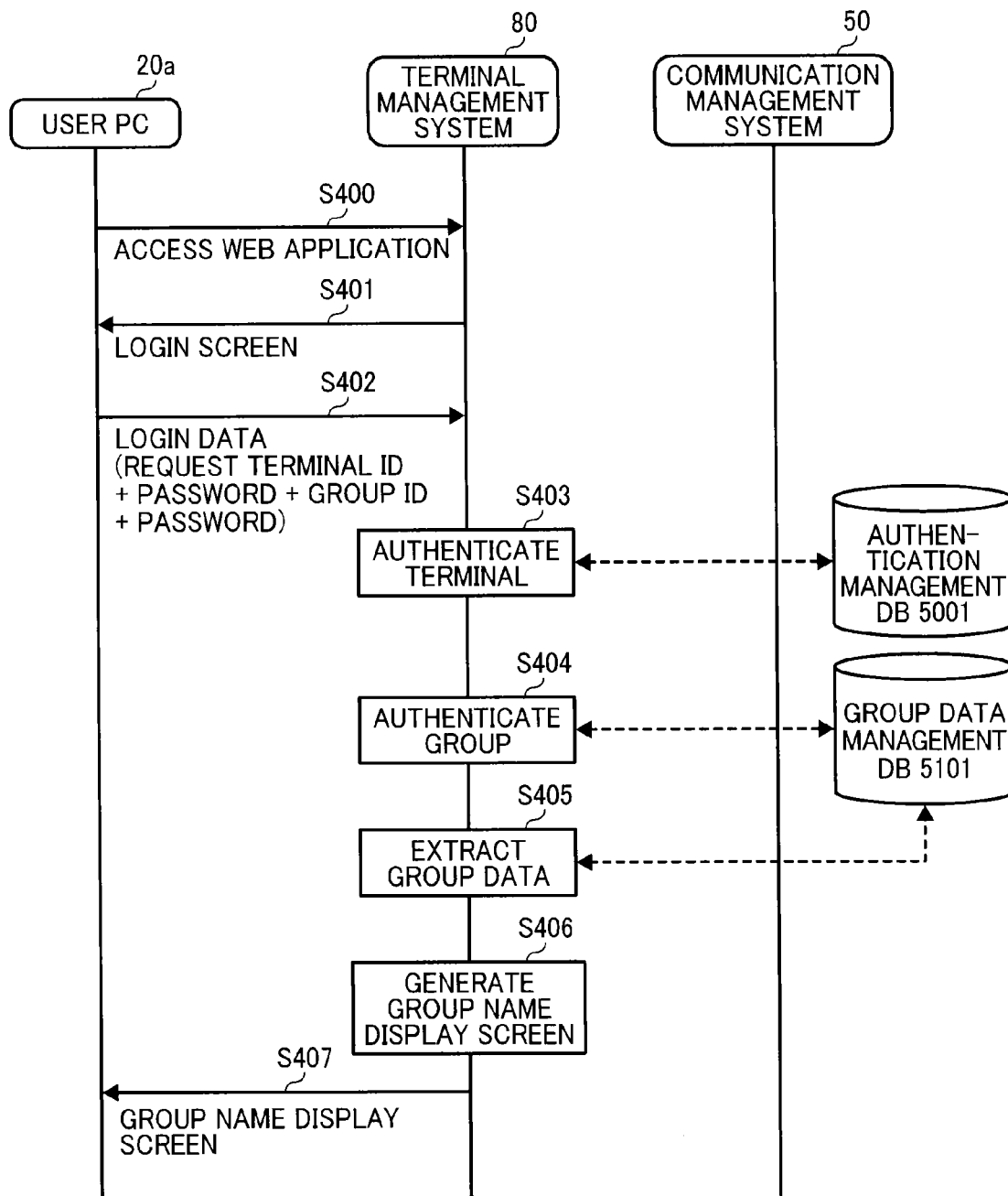
FIG. 33 is a data sequence diagram illustrating operation of processing a request for displaying information regarding a group that can be shared, performed by the communication system of FIG. 31, according to an example embodiment of the present invention.
Figure 34A:
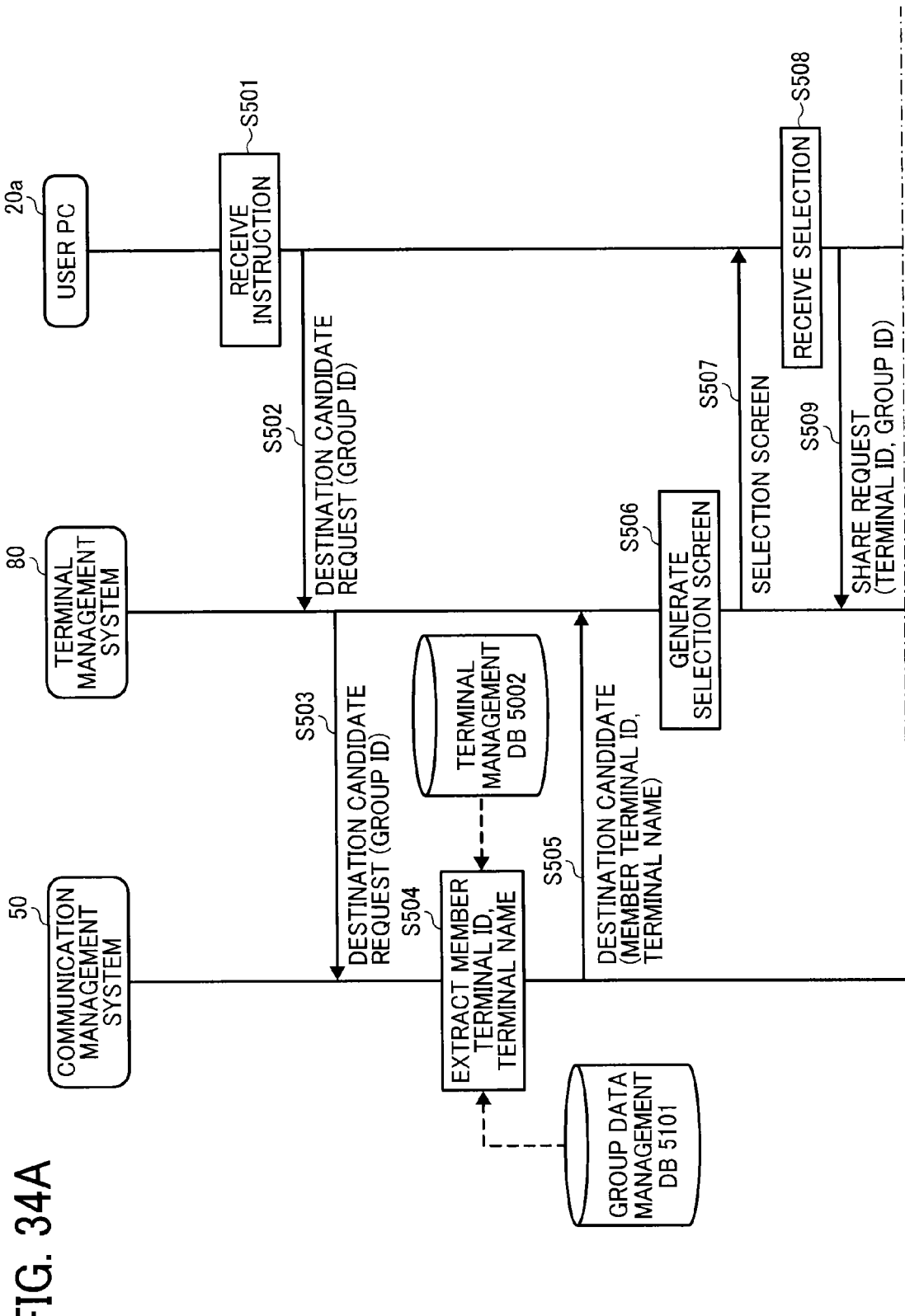
FIGS. 34A and 34B illustrate a data sequence diagram illustrating operation of processing a share request, performed by the communication system of FIG. 31, according to an example embodiment of the present invention.
Figure 34B:
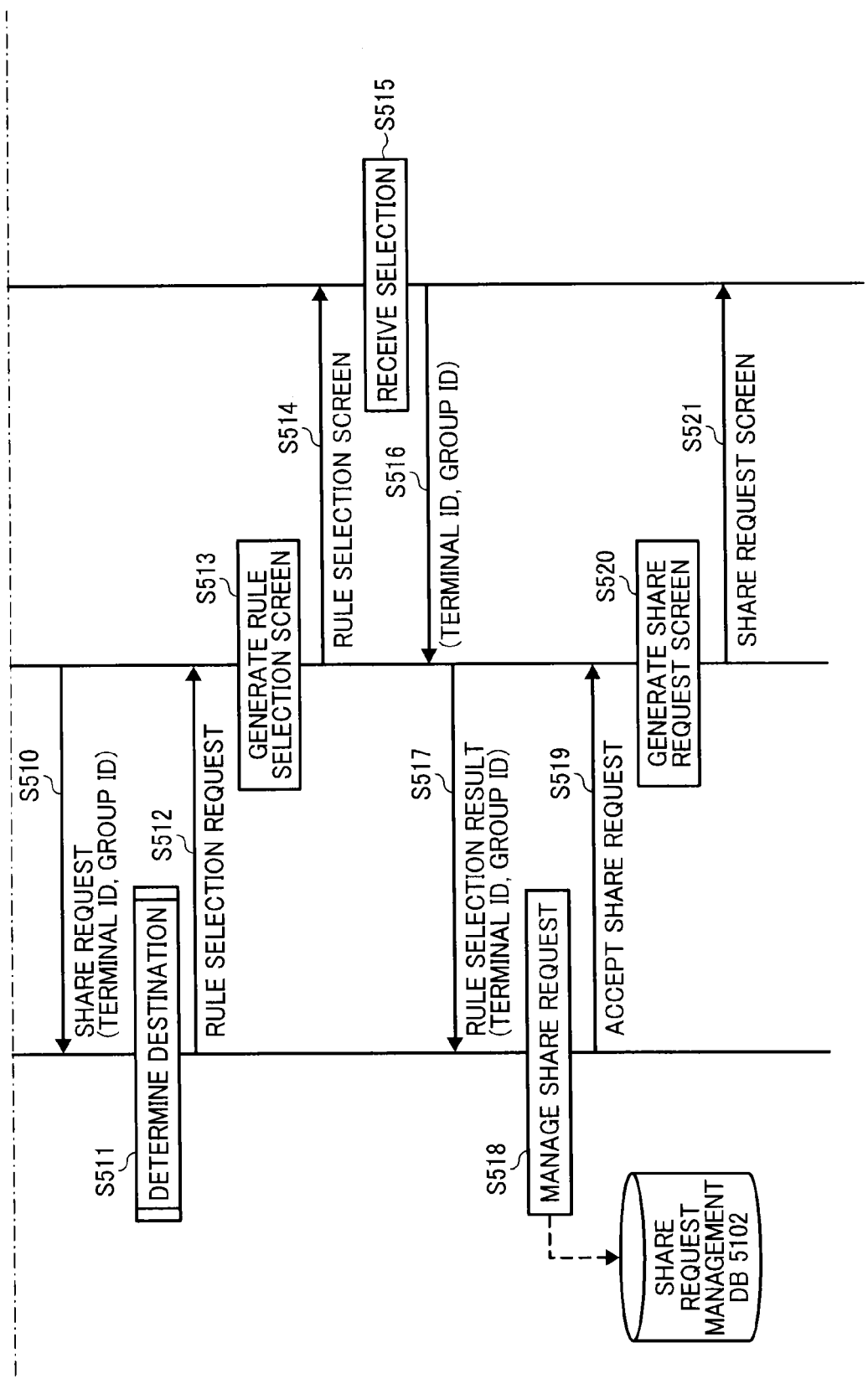

Referring to FIGS. 33, 34A and 34B, operation of sending a plurality of share requests each requesting to share a group member list, performed by the communication system 1A, is explained according to an example embodiment of the present invention.

FIG. 33 is a data sequence diagram illustrating operation of processing a request for displaying information regarding a group that can be shared, according to an example embodiment of the present invention.

As the user "a" of the user PC 20a inputs a specified URL through the web browser at the user PC 20a, at S400, the user PC 20a accesses web application provided by the communication terminal management system 80.

At S401, the data transmitter/receiver 81 of the communication terminal management system 80 sends a login screen to the user PC 20a, using the web server function. The login screen is displayed through the user PC 20a.

The user "a" inputs the terminal ID and the password of the request terminal 10aa operated by the user "a", and the group ID of the group that the user wants to share, through the login screen. At S402, the user PC 20a transmits login request information including the terminal ID and the password of the request terminal 10aa, and the group ID of the group subjected for sharing, to the communication terminal management system 80. In addition to the group ID, the user may input a group password, which is associated with the group ID, such that the login request information may further include the group ID of the group subjected for sharing.

At S403, the authenticator 82 of the communication terminal management system 80 accesses the management system 50 to search the authentication management DB 5001 (FIG. 6) stored in the memory 5000 to determine whether the terminal ID and the password of the request terminal 10aa have been registered. Based on determination, the authenticator 82 generates an authentication result indicating whether the terminal 10aa of the user "a" at the user PC 20a is authenticated.

At S404, the authenticator 82 of the communication terminal management system 80 accesses the management system 50 to search the group data management DB 5101 (FIG. 9A) using the group ID included in the login request information as a search key to obtain the owner terminal ID associated with the group ID. The authenticator 82 determines whether the request terminal ID matches the owner terminal ID, to determine whether the group identified by the group ID of the login request information is owned by the request terminal 10aa.

In addition or in alternative to authenticating the owner terminal, the authenticator 82 may determine whether a set of group ID and password, which matches the set of group ID and password obtained from the login request information, is previously registered to the management system 50 through accessing the memory 5000 such as the group data management DB 5101. More specifically, the group data management table of FIG. 9 may additionally store a group password, in association with the group ID and the owner terminal ID. The group password may be input by the user of the owner terminal, for example, through the owner terminal.

When the terminal authentication result at S403 and the group authentication result at S404 are both successful, the operation proceeds to S405. At S405, the extractor 83 of the communication terminal management system 80 searches the group data management DB 5101 (FIG. 9A) using the request terminal ID "01aa" as a search key to obtain a record for the owner terminal ID "01aa". The extractor 83 obtains various group information such as the group name "Project A" and the group ID "0001".

At S406, the generator 84 generates a group name display screen, based on the group name and the group ID that are extracted, in the form of HTML.

At S407, the data transmitter/receiver 81 of the communication terminal management system 80 sends the group name display screen to the user PC 20a, using the web server function. The user PC 20a displays the group name display screen on a display, for example, as illustrated in FIG. 14.

FIGS. 34A and 34B illustrate a data sequence diagram illustrating operation of processing a share request, performed by the communication system 1A, according to an example embodiment of the present invention.

Assuming that the user "a" at the user PC 20a selects the "SHARE REQUEST" key through the group name display screen of FIG. 14 using such as a mouse, at S501, the user PC 20a receives the user instruction for selecting the group to share.

At S502, the user PC 20a transmits destination candidate request information ("destination candidate request") to the communication terminal management system 80 through the communications network 2. The destination candidate request requests information regarding one or more candidates of share request destination terminals that the user at the user PC 20a may want to share the group member list with. The destination candidate request includes the group ID "0001" of the selected group.

At S503, the communication terminal management system 80 transmits the destination candidate request to the communication management system 50. The management system 50 receives the destination candidate request at the data transmitter/receiver 51.

At S504, the extractor 54 of the management system 50 searches the group data management DB 5101 (FIG. 9A) using the group ID "0001" included in the destination candidate request, as a search key, to obtain the member terminal IDs associated with the group ID "0001". The extractor 54 further searches the terminal management DB 5002 (FIG. 7) using the obtained member terminal ID, to obtain the name of the member terminal, for each one of the member terminals.

At S505, the data transmitter/receiver 51 of the management system 50 transmits destination candidate information, which includes the terminal ID and the terminal name of the member terminal in the selected group, to the communication terminal management system 80. The communication terminal management system 80 receives the destination candidate information at the data transmitter/receiver 81.

At S506, the generator 84 of the communication terminal management system 80 generates a share request destination selection screen, which includes the destination candidate terminal ID and the destination candidate terminal name, which are included in the destination candidate information received from the management system 50, in HTML. In this example, the request terminal 10aa is excluded from the share request destination selection screen.

At S507, the data transmitter/receiver 81 sends the share request destination selection screen to the user PC 20a, using the web server function. The user PC 20a displays the share request destination selection screen, for example, as illustrated in FIG. 35.

Figure 35:
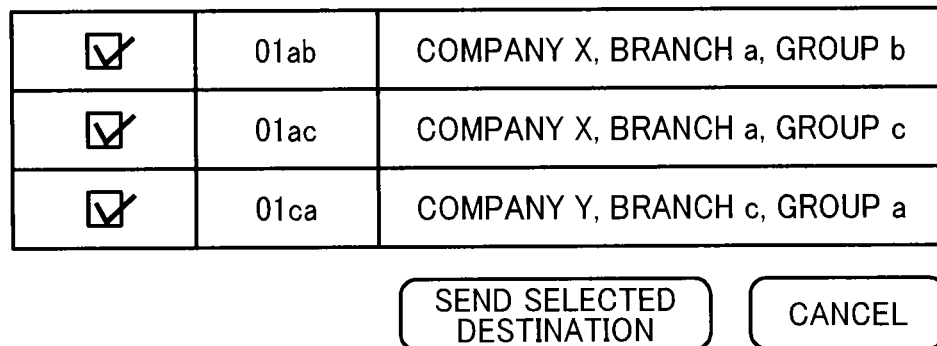
FIG. 35 is an example share request destination selection screen.

Assuming that the user "a" selects a check box for two or more member terminals on the selection screen of FIG. 35, for example, through the mouse, at S508, the user PC 20a accepts the user selection that selects the member terminals as a share request destination terminal. In this example, it is assumed that the user selects all member terminals, as indicated by FIG. 35. In this manner, the share requests for the plurality of member terminals can be received at once.

At S509, the user PC 20a transmits share request information, that is, a share request for requesting to share the group member list with the selected terminals 10ab, 10ac, and 10ca, to the communication terminal management system 80. The share request includes the terminal ID "01aa" of the share request sender terminal 10aa, the terminal IDs "01ab" "01ac" and "01ca" of the share request destination terminals 10ab, 10ac, and 10ca, and the group ID "0001" of the group subjected for sharing.

At S510 of FIG. 34B, the communication terminal management system 80 sends the share request information to the management system 50. The management system 50 receives the share request at the data transmitter/receiver 51.

At S511, the destination determiner 55 of the management system 50 determines whether the candidate list management table (FIG. 8) stores the member terminal of the selected group "0001", as the candidate counterpart terminal for the share request destination terminal 10, for example, in a substantially similar manner as described above referring to S40 of FIG. 13. S511 may be performed for each one of the destination terminals 10ab, 10ac, and 10ca.

At S512, the data transmitter/receiver 51 of the management system 50 sends a request for selecting a rule to be applied, that is, the rule selection request, to the communication terminal management system 80, in a substantially similar manner as described above referring to S41 of FIG. 13. The rule selection request includes rule information indicating one or more rules for selection. The communication terminal management system 80 receives the rule selection request at the data transmitter/receiver 81.

At S513, the generator 84 generates a rule selection screen, based on the rule information that is received, in HTML.

At S514, the data transmitter/receiver 81 sends the rule selection screen to the user PC 20a, using the web server function, for display at the user PC 20a.

Assuming that the rule section screen of FIG. 17 is displayed, the user "a" at the user PC 20a may select an arbitrary radio button for a specific rule to be applied, for example, using the mouse. At S515, the user PC 20a receives a user instruction for selecting a specific rule.

At S516, the user PC 20a sends a rule selection result, which indicates the selected rule, to the communication terminal management system 80. The user PC 20a further sends any other information regarding the share request, such as the terminal ID of the share request sender terminal 10aa, the terminal IDs of the share request destination terminals 10ab, 10ac, and 10ca, and the group ID of the group subjected for sharing, to the communication terminal management system 80.

At S517, the communication terminal management system 80 sends the rule selection result to the management system 50. The management system 50 receives the rule selection result at the data transmitter/receiver 51.

At S518, the share request manager 58 of the management system 50 stores the terminal ID of the share request sender terminal, the terminal ID of the share request destination terminal, the group ID, and the selected rule, which are respectively obtained from the communication management system 80, in the share request management table (FIG. 10).

As registration to the share request management table completes, at S519, the data transmitter/receiver 51 sends information indicating that the share request is accepted, to the communication terminal management system 80. The communication terminal management system 80 receives the information indicating acceptance of the share request at the data transmitter/receiver 81.

At S520, the generator 84 generates a share request acceptance screen, which indicates that the share request is accepted.

At S521, the data transmitter/receiver 81 sends the share request acceptance screen to the user PC 20a, using the web server function, for display at the user PC 20a.

As the share request is accepted, S51 to S57 of FIG. 18, S61 to S67 of FIG. 24, and S71 to S74 of FIG. 25 may be performed at each destination terminal 10, to register one or more member terminals in the group as a candidate counterpart terminal for the destination terminal 10.

In case the user "a" is an administrator who manages the group information, the unregistered member terminal may be added as a candidate counterpart terminal for the destination terminal, without performing the approval process of S61 to S67 of FIG. 24, in a substantially similar manner as in the case where the rule C is selected.

The above-described operation of FIGS. 33 to 34 may be performed in various other ways.

For example, in addition to or in alternative to the authentication process performed through S402 to S404 of FIG. 33, operation of authenticating the administrator may be performed. In such case, the communication terminal management system 80 may store an administrator ID and an administrator password in the memory. In response to the ID and password that are sent from the user PC 20, the communication terminal management system 80 may determine whether the user at the user PC 20 is the administrator.

Figure 36:
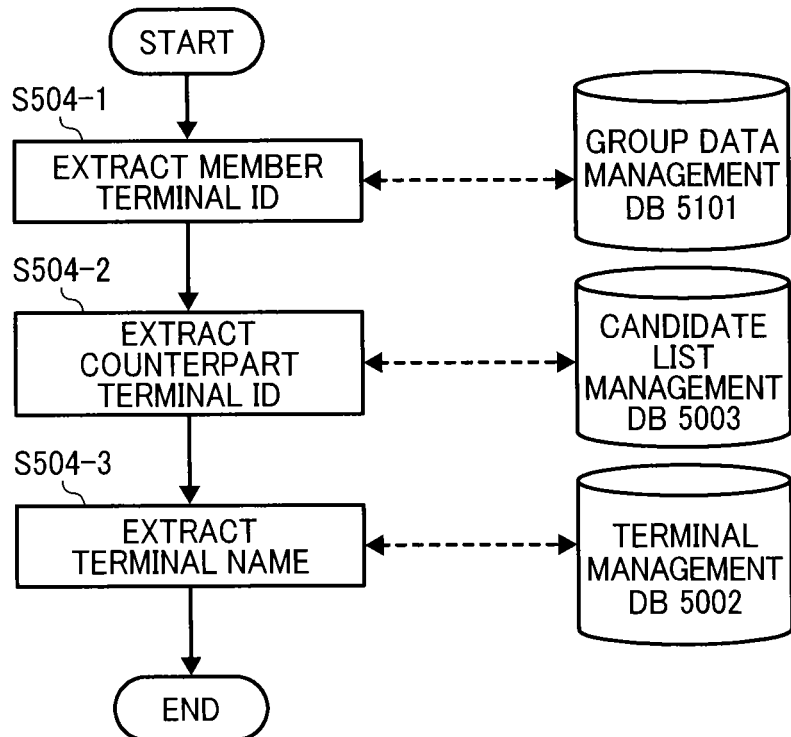
FIG. 36 is a flowchart illustrating operation of selecting a candidate of a share request destination terminal, performed by the management system of the communication system of FIG. 31, according to an example embodiment of the present invention.

Further, S504 of FIG. 34A may be performed differently, for example, as illustrated in FIG. 36.

At S504-1, the extractor 54 of the management system 50 searches the group data management DB 5101 (FIG. 9A) using the group ID "0001" included in the destination candidate request, as a search key, to obtain the member terminal IDs associated with the group ID "0001".

At S504-2, the extractor 54 searches the candidate list management table (FIG. 8) using the member terminal ID that is extracted at S504-1, to obtain the candidate counterpart terminal ID associated with the request terminal ID that is equal to the member terminal ID.

At S504-3, the extractor 54 searches the terminal management DB 5002 (FIG. 7) using the terminal IDs, which are respectively obtained at S504-1 and S504-2, to obtain the terminal names of the member terminals, and the candidate counterpart terminals for the member terminals.

Referring back to FIG. 34A, at S505, the data transmitter/receiver 51 of the management system 50 transmits the destination candidate information, which includes the terminal IDs and the terminal names of the member terminals and the candidate counterpart terminals for the member terminals, to the communication terminal management system 80.

As described above, in this example, the candidate counterpart terminals for the member terminals are additionally included, as a candidate of a share request destination terminal. In this manner, the owner terminal can send a share request, not only to the member terminal of the group, but also to a candidate counterpart terminal for the member terminal, thus improving user operability.

In the above-described example embodiments, the relay device 30, the management system 50, the communication terminal management system 80, the program providing system 90, and the maintenance system 100 may each be implemented by a single computer. Alternatively, any number of parts, functions, or modules of the relay device 30, the management system 50, the communication terminal management system 80, the program providing system 90, and the maintenance system 100 may be classified into a desired number of groups to be carried out by a plurality of computers.

For example, the management system 50 may be implemented by a computer functioning as a management apparatus, and a computer functioning as a web application server. In such case, the management apparatus may be provided with a candidate list management DB 5003. The web application server provides web application services to the terminal 10 or the user PC 20. Based on a request received through the web browser, the web application server may output an instruction for updating the candidate list to the management apparatus. The management apparatus and the web application server may be located within the same country, or located in different countries.

In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

In the above-described example embodiments, a share request for sharing group information is requested, using the communication terminal 10 that may be used for videoconference. Alternatively, any desired information processing apparatus such as any type of PC such as a work station or a tablet, or a PDA such as a smart phone, may be used to request a share request. In such case, the information processing apparatus may have a functional structure that is substantially similar to the functional structure illustrated in FIG. 5, and the hardware structure as illustrated in FIG. 4.

In such case, the data transmitter/receiver 11 may be implemented by the network I/F 209 that operates in cooperation with the instructions from the CPU 201. The operation input 12 may be implemented by the keyboard 211 or the mouse 212. The login request 13 may be implemented by the instructions from the CPU 201. The imaging device 14 may be implemented by a camera, which may be incorporated or attached to the information processing apparatus. The sound input 15*a* may be implemented by a microphone, which may be incorporated or attached to the information processing apparatus. The sound output 15*b* may be implemented by a speaker, which may be incorporated or attached to the information processing apparatus. The display control 16 may be implemented by the display 208.

In the above-described example embodiments, the terminal ID is used as identification information that identifies any one of the request terminal, counterpart terminal, member terminal, owner terminal, and user terminal. In alternative to or in addition to the terminal ID, user identification (user ID) that identifies a user who operates the terminal 10 may be used. In such case, a user ID of a user who operates a specific terminal, such as the request terminal, counterpart terminal, member terminal, owner terminal, or user terminal, may be used.

In the above-described example embodiments, the candidate list management table (FIG. 8) stores the terminal ID for each one of one or more candidate counterpart terminals that can be selected by the request terminal 10 to have communication. Alternatively, any other information that can identify the candidate counterpart terminal may be stored. Examples of identification information for identifying a candidate counterpart terminal include, but not limited to, a telephone number of a candidate counterpart terminal, and an IP address indicating the network location of a candidate counterpart terminal. The group data management table (FIG. 9) or the share request management table (FIG. 10) may additionally store a telephone number or an IP address, in association with the member terminal ID, owner terminal ID, and user terminal ID. With the additional information, the management system 50 is able to easily contact the terminal.

A recording medium storing any one of the terminal control program, relay control program, and communication management program, or a storage device such as the HDD 204 that stores any one of the terminal control program, relay control program, and communication management program, or the program providing system 90 provided with the HD 204 storing any one of the terminal control program, relay control program, and communication management program, may be distributed within the country or to another country as a computer program product.

In the above-described example embodiments, the communication system is treated as a videoconference system. Alternatively, the communication system may be implemented as a teleconference system such as the IP teleconference system or the Internet teleconference system, or a computer system. Alternatively, the communication system may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the communication system may be implemented as a communication system having a portable phone, smart phone, tablet, game machine, etc. In such case, the terminal 10 may be implemented as the portable phone, smart phone, tablet, game machine, etc.

In the above-described examples, the contents data is assumed to include image data and sound data such as voice data. Alternatively, the contents data may include any other type of data that affects human senses of sight in alternative to image data, or any other type of data that affects human senses of hearing in alternative to voice data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as voice data, touch data, smell data, and taste data.

Further, in the above-described examples, the communication system is implemented as a videoconference system for use at offices. Other examples of use of the communication system include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A communication management system, comprising:
a memory that stores first candidate information of a first communication terminal of a plurality of communication terminals, the first candidate information associating a group of one or more member communication terminals, with the first communication terminal;
a transmitter that sends a request for selecting whether to modify the first candidate information of the first communication terminal, to a second communication terminal of the plurality of communication terminals, in response to receiving a request for sending the first candidate information to the second communication terminal from the first communication terminal;
a receiver that receives information indicating whether to modify the first candidate information of the first communication terminal, from the second communication terminal; and
a processor that modifies the group of one or more member communication terminals indicated by the first candidate information of the first communication terminal in response to the information indicating to modify the first candidate information of the first communication terminal to generate second candidate information of the second communication terminal, the second candidate information associating a modified group of one or more member communication terminals, with the second communication terminal.

2. The communication management system of claim 1, wherein
when the information indicating to modify the first candidate information of the first communication terminal is received, the processor stores the second candidate information of the second communication terminal in association with identification information that identifies the second candidate information.

3. The communication management system of claim 1, wherein the information indicating to modify the first candidate information of the first communication terminal includes at least one of:
a request to add one or more communication terminals to the group of one or more member communication terminals indicated by the first candidate information; and
a request to add one or more communication terminals from the group of one or more member communication terminals indicated by the first candidate information.

4. The communication management system of claim 3, further comprising:
a memory that stores information indicating one or more candidate counterpart communication terminals each selectable by the second communication terminal to have communication, with the second communication terminal,
wherein one or more member communication terminals to be added is selected using the information indicating one or more candidate counterpart communication terminals.

5. The communication management system of claim 1, wherein
when the information indicating not to modify the first candidate information of the first communication terminal is received, the processor associates the first candidate information of the first communication terminal with the second communication terminal without generating the second candidate information of the second communication terminal.

6. The communication management system of claim 5, wherein
when the information indicating not to modify the first candidate information of the first communication terminal is received, the processor stores identification information that identifies the second communication terminal in association with the first candidate information of the first communication terminal.

7. The communication management system of claim 1, further comprising:
when the information indicating to modify the first candidate information of the first communication terminal is received, the transmitter sends the second candidate information to the second communication terminal, and
when the information indicating not to modify the first candidate information of the first communication terminal is received, the transmitter sends the first candidate information to the second communication terminal.

8. The communication management system of claim 1, wherein the second communication terminal is selected from the group of one or more member communication terminals, associated with the first communication terminal.

9. The communication management system of claim 8, wherein the first communication terminal is one of the group of one or more member communication terminals, associated with the first communication terminal.

10. A communication terminal, comprising:
- a display that displays information regarding first candidate information of an owner communication terminal, the first candidate information associating a group of one or more member communication terminals with the owner communication terminal and being modifiable by the owner communication terminal but not by the member communication terminal;
- a user interface that receives a user selection that selects whether to modify the first candidate information of the owner communication terminal;
- a transmitter that sends information indicating whether to modify the first candidate information of the owner communication terminal based on the user selection, to a communication management system; and
- a receiver that receives, when the information indicating to modify the first candidate information is transmitted, second candidate information of the member communication terminal from the communication management system, the second candidate information being modifiable by the member communication terminal but not by the owner communication terminal.

11. The communication terminal of claim 10, wherein
the receiver receives, when the information indicating not to modify the first candidate information is transmitted, the first candidate information of the owner communication terminal.

12. The communication terminal of claim 11, wherein the display displays one of:
- a first screen that allows a user to store the first candidate information of the owner communication terminal without modification; or
- a second screen that allows a user to input a user instruction for modifying the first candidate information of the owner communication terminal.

13. The communication terminal of claim 12, wherein the user instruction for modifying includes information indicating one or more communication terminals to be added or deleted to or from the group of one or more member communication terminals.

14. A method of managing candidate information of a plurality of communication terminals, comprising:
- storing first candidate information of a first communication terminal of the plurality of communication terminals in a memory, the first candidate information associating a group of one or more member communication terminals, with the first communication terminal;
- sending a request for selecting whether to modify the first candidate information of the first communication terminal, to a second communication terminal of the plurality of communication terminals, in response to receiving a request for sending the first candidate information to the second communication terminal from the first communication terminal;
- receiving information indicating whether to modify the first candidate information of the first communication terminal, from the second communication terminal; and
- modifying the group of one or more member communication terminals indicated by the first candidate information of the first communication terminal in response to the information indicating to modify the first candidate information of the first communication terminal to generate second candidate information of the second communication terminal, the second candidate information associating a modified group of one or more member communication terminals, with the second communication terminal.

* * * * *